United States Patent
Miura et al.

(10) Patent No.: US 9,656,477 B2
(45) Date of Patent: *May 23, 2017

(54) INK COMPOSITION FOR ULTRAVIOLET CURABLE INK JETS, INK JET RECORDING APPARATUS USING THE SAME, INK JET RECORDING METHOD USING THE SAME, AND INK SET

(71) Applicant: Seiko Epson Corporation, Tokyo (JP)

(72) Inventors: Satoru Miura, Matsumoto (JP); Hiroki Nakane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/797,333

(22) Filed: Jul. 13, 2015

(65) Prior Publication Data

US 2015/0315394 A1 Nov. 5, 2015

Related U.S. Application Data

(63) Continuation of application No. 13/324,347, filed on Dec. 13, 2011, now Pat. No. 9,109,125.

(30) Foreign Application Priority Data

Dec. 13, 2010 (JP) .................................. 2010-277260
Jul. 21, 2011 (JP) .................................. 2011-159615

(51) Int. Cl.
*B41J 2/21* (2006.01)
*B41J 11/00* (2006.01)
(Continued)

(52) U.S. Cl.
CPC ............ *B41J 2/2107* (2013.01); *B41J 11/002* (2013.01); *C09D 11/101* (2013.01); *C09D 11/107* (2013.01); *C09D 11/30* (2013.01)

(58) Field of Classification Search
CPC ........ B41J 2/01; B41J 2/2107; B41J 11/0015; B41J 11/002; C09D 11/101; C09D 11/107; C09D 11/30; C09D 11/322
(Continued)

(56) References Cited

U.S. PATENT DOCUMENTS

| 4,507,466 A | 3/1985 | Tomalia et al. |
| 4,558,120 A | 12/1985 | Tomalia et al. |

(Continued)

FOREIGN PATENT DOCUMENTS

| CN | 101163758 A | 4/2008 |
| CN | 101573387 A | 11/2009 |

(Continued)

OTHER PUBLICATIONS

U.S. Appl. No. 12/188,429, filed Aug. 8, 2008, Photocurable Ink Composition, Ink Jet Recording Method, and Recording Matter.
(Continued)

*Primary Examiner* — Manish S Shah
(74) *Attorney, Agent, or Firm* — Nutter McClennen & Fish LLP; John J. Penny, Jr.; Alex Nagorniy

(57) ABSTRACT

An ink composition for ultraviolet curable ink jets including monomer A represented by a general formula (I):

$$CH_2=CR_1-COOR_2O-CH=CH-R_3 \quad (I)$$

(in the formula, 'R1' represents a hydrogen atom or methyl group, 'R2' represents a divalent organic residue having a carbon number of 2 to 20, and 'R3' represents a hydrogen atom or a monovalent organic residue having a carbon number of 1 to 11), and a photopolymerization initiator containing an acylphosphine oxide-based photopolymerization initiator and a thioxanthone-based photopolymerization initiator, in which the total content of the acylphosphine oxide-based photopolymerization initiator and the thioxan- (Continued)

thone-based photopolymerization initiator is 8% by mass to 16% by mass with respect to the total mass of the ink composition.

16 Claims, 2 Drawing Sheets

(51) Int. Cl.
C09D 11/107 (2014.01)
C09D 11/30 (2014.01)
C09D 11/101 (2014.01)

(58) Field of Classification Search
USPC .............. 347/95–100, 102; 106/31.13, 31.6
See application file for complete search history.

(56) References Cited

U.S. PATENT DOCUMENTS

| | | | |
|---|---|---|---|
| 4,568,737 A | 2/1986 | Tomalia et al. | |
| 4,587,329 A | 5/1986 | Tomalia et al. | |
| 4,631,337 A | 12/1986 | Tomalia et al. | |
| 4,694,064 A | 9/1987 | Tomalia et al. | |
| 5,041,516 A | 8/1991 | Frechet et al. | |
| 6,023,547 A | 2/2000 | Tortorello | |
| 6,310,115 B1 | 10/2001 | Vanmaele et al. | |
| 6,767,980 B2 | 7/2004 | Yurugi et al. | |
| 6,913,352 B2 | 7/2005 | Yoshihiro et al. | |
| 6,966,643 B2 | 11/2005 | Hale et al. | |
| 7,396,861 B2 | 7/2008 | Loccufier et al. | |
| 7,507,773 B2 | 3/2009 | Loccufier et al. | |
| 7,507,785 B2 | 3/2009 | Vanmaele et al. | |
| 7,538,144 B2 | 5/2009 | Vanmaele et al. | |
| 7,795,324 B2 | 9/2010 | Loccufier et al. | |
| 7,803,851 B2 | 9/2010 | Ishibashi et al. | |
| 7,875,698 B2 | 1/2011 | Vanmaele et al. | |
| 7,931,827 B2 | 4/2011 | Schneider et al. | |
| 8,158,214 B2 | 4/2012 | Fukumoto et al. | |
| 8,192,804 B2 | 6/2012 | Fukumoto et al. | |
| 8,470,904 B2 | 6/2013 | Sato et al. | |
| 9,090,787 B2 | 7/2015 | Yoda et al. | |
| 9,109,125 B2 | 8/2015 | Miura et al. | |
| 9,115,290 B2 | 8/2015 | Kida et al. | |
| 9,469,771 B2 | 10/2016 | Mizutaki et al. | |
| 2002/0065335 A1 | 5/2002 | Noguchi et al. | |
| 2002/0149659 A1 | 10/2002 | Wu et al. | |
| 2003/0199655 A1 | 10/2003 | Yurugi et al. | |
| 2004/0141040 A1 | 7/2004 | Nakajima | |
| 2004/0145639 A1 | 7/2004 | Noutary | |
| 2004/0166249 A1 | 8/2004 | Siegel | |
| 2006/0158493 A1 | 7/2006 | Nakano et al. | |
| 2006/0160917 A1 | 7/2006 | Oyanagi et al. | |
| 2007/0129457 A1 | 6/2007 | Nakano et al. | |
| 2007/0211111 A1 | 9/2007 | Hayata | |
| 2007/0249750 A1 | 10/2007 | Oyanagi et al. | |
| 2008/0081119 A1 | 4/2008 | Oyanagi et al. | |
| 2008/0090930 A1 | 4/2008 | Madhusoodhanan et al. | |
| 2008/0108747 A1 | 5/2008 | Nakamura et al. | |
| 2008/0166495 A1 | 7/2008 | Maeno et al. | |
| 2008/0180503 A1 | 7/2008 | Umebayashi | |
| 2008/0200578 A1 | 8/2008 | Noutary | |
| 2008/0226834 A1 | 9/2008 | Krohn | |
| 2008/0239045 A1 | 10/2008 | Umebayashi et al. | |
| 2009/0000508 A1 | 1/2009 | Edison et al. | |
| 2009/0041946 A1 | 2/2009 | Fukumoto et al. | |
| 2009/0099277 A1 | 4/2009 | Nagvekar et al. | |
| 2009/0118388 A1 | 5/2009 | Naruse et al. | |
| 2009/0197988 A1 | 8/2009 | Kito et al. | |
| 2009/0280302 A1 | 11/2009 | Fukumoto et al. | |
| 2010/0048756 A1 | 2/2010 | Loccufier et al. | |
| 2010/0133728 A1 | 6/2010 | Yonezawa et al. | |
| 2010/0313782 A1 | 12/2010 | Loccufier et al. | |
| 2011/0234680 A1 | 9/2011 | Aoyama et al. | |
| 2011/0251298 A1 | 10/2011 | Kagose et al. | |
| 2012/0069108 A1 | 3/2012 | Oyanagi et al. | |
| 2012/0147095 A1 | 6/2012 | Miura et al. | |
| 2012/0229583 A1 | 9/2012 | Fukumoto et al. | |
| 2012/0252919 A1 | 10/2012 | Suzuki et al. | |
| 2012/0274717 A1 | 11/2012 | Nakano et al. | |
| 2013/0010039 A1 | 1/2013 | Kida et al. | |
| 2013/0063535 A1 | 3/2013 | Yoda et al. | |
| 2013/0258015 A1 | 10/2013 | Mizutaki et al. | |
| 2014/0104356 A1 | 4/2014 | Kitade et al. | |
| 2014/0160215 A1 | 6/2014 | Saito et al. | |
| 2015/0275001 A1 | 10/2015 | Yoda et al. | |
| 2015/0315396 A1 | 11/2015 | Kida et al. | |

FOREIGN PATENT DOCUMENTS

| | | |
|---|---|---|
| EP | 2 017 311 A1 | 1/2009 |
| EP | 2 053 103 A1 | 4/2009 |
| EP | 2 399 965 A1 | 12/2011 |
| EP | 2 399 966 A1 | 12/2011 |
| EP | 2 543 707 A1 | 1/2013 |
| JP | 11-302562 A | 11/1999 |
| JP | 3461501 B1 | 10/2003 |
| JP | 2004-067991 A | 3/2004 |
| JP | 2004-099796 A | 4/2004 |
| JP | 3544658 B2 | 7/2004 |
| JP | 2004-224841 A | 8/2004 |
| JP | 2004-526820 A | 9/2004 |
| JP | 2006-028518 A | 2/2006 |
| JP | 2006-176734 A | 7/2006 |
| JP | 2006-181801 A | 7/2006 |
| JP | 2006-199924 A | 8/2006 |
| JP | 2006-206875 A | 8/2006 |
| JP | 2006-232989 A | 9/2006 |
| JP | 2007-045989 A | 2/2007 |
| JP | 2007-083509 A | 4/2007 |
| JP | 2007-100054 A | 4/2007 |
| JP | 2007-136988 A | 6/2007 |
| JP | 2007-182536 A | 7/2007 |
| JP | 2007-314744 A | 12/2007 |
| JP | 2007-314775 A | 12/2007 |
| JP | 2008-019292 A | 1/2008 |
| JP | 2008-507598 A | 3/2008 |
| JP | 2008-120991 A | 5/2008 |
| JP | 2008-163080 A | 7/2008 |
| JP | 2008-179136 A | 8/2008 |
| JP | 2008-246832 A | 10/2008 |
| JP | 2008-280383 A | 11/2008 |
| JP | 4204333 B2 | 1/2009 |
| JP | 2009-035650 A | 2/2009 |
| JP | 2009-062541 A | 3/2009 |
| JP | 2009-096910 A | 5/2009 |
| JP | 2009-226863 A | 10/2009 |
| JP | 2010-138315 A | 6/2010 |
| JP | 2010-157706 A | 7/2010 |
| JP | 2010-179536 A | 8/2010 |
| JP | 2009-057548 A | 9/2010 |
| JP | 2011-500932 A | 1/2011 |
| JP | 2011-502188 A | 1/2011 |
| JP | 2011-074134 A | 4/2011 |
| JP | 2011-137069 A | 7/2011 |
| JP | 2011-194573 A | 10/2011 |
| JP | 2012-207084 A | 10/2012 |
| JP | 2013-053208 A | 3/2013 |
| WO | 03/089486 A1 | 10/2003 |
| WO | 2006/085992 A2 | 8/2006 |
| WO | 2009/053305 A1 | 4/2009 |
| WO | 2011/027162 A1 | 3/2011 |
| WO | 2011/076703 A1 | 6/2011 |
| WO | 2012/172973 A1 | 12/2012 |
| WO | 2012/172974 A1 | 12/2012 |

OTHER PUBLICATIONS

U.S. Appl. No. 13/324,347, filed Dec. 13, 2011, Ink Composition for Ultraviolet Curable Ink Jets, Ink Jet Recording Apparatus Using the Same, Ink Jet Recording Method Using the Same, and Ink Set.

(56) References Cited

OTHER PUBLICATIONS

U.S. Appl. No. 13/458,184, filed Apr. 27, 2012, Photocurable Ink Composition, Recording Method, Recording Apparatus, Photocurable Ink Jet Recording Ink Composition, and Ink Jet Recording Method.
U.S. Appl. No. 13/478,481, filed May 23, 2012, Photocurable Ink Composition, Ink Jet Recording Method, and Recording Matter.
U.S. Appl. No. 13/544,539, filed Jul. 9, 2012, Photocurable Ink Composition for Ink Jet Recording and Ink Jet Recording Method.
U.S. Appl. No. 13/611,095, filed Sep. 12, 2012, Photocurable Ink Jet Recording Ink Composition and Ink Jet Recording Method.
U.S. Appl. No. 14/735,675, filed Jun. 10, 2015, Photocurable Ink Jet Recording Ink Composition and Ink Jet Recording Method.
[No Author Listed] High lights! Radiation curing with resins and photoinitiators for industrial coatings and graphic arts: Laromer, Irgacure, Lucirin, Darocur. BASF SE. No publishing date available. 44 pages.

INK COMPOSITION FOR ULTRAVIOLET CURABLE INK JETS, INK JET RECORDING APPARATUS USING THE SAME, INK JET RECORDING METHOD USING THE SAME, AND INK SET

This application is a continuation of and claims priority to U.S. patent application Ser. No. 13/324,347 filed Dec. 13, 2011, which claims priority under 35 U.S.C. §119 to Japanese Patent Application No. 2010-277260 filed Dec. 13, 2010, as well as Japanese Patent Application No. 2011-159615 filed Jul. 21, 2011, each of which are hereby incorporated by reference in its entirety.

BACKGROUND

1. Technical Field

The present invention relates to an ink composition for ultraviolet curable ink jets, an ink jet recording apparatus using the same, an ink jet recording method using the same, and an ink set.

2. Related Art

In the past, a variety of modes were used as recording methods to form images on recording media, such as paper, based on image data signals. Among them, an ink jet system uses a cheap apparatus, in which an ink is discharged only on necessary image portions so as to directly form images on a recording medium, and therefore the ink can be used efficiently, and the running cost is cheap. Furthermore, the ink jet mode makes little noise, and is thus excellent as a recording method.

In recent years, an ink composition for ultraviolet curable ink jets which is cured when ultraviolet rays are irradiated has been used as an ink composition that can provide favorable water resistance, solvent resistance, abrasion resistance, and the like in the recording method of an ink jet mode.

For example, JP-A-2008-280383 discloses an ink composition for ultraviolet curable ink jets which is composed of 2-(2-vinyloxyethoxy)ethyl acrylate, tripropylene glycol diacrylate, an acrylic resin, and a photopolymerization initiator.

In addition, JP-A-2009-226863 discloses a liquid of an adhesive precursor for ultraviolet curable ink jets which is composed of N-vinyl caprolactam, 2-ethylhexyl acrylate, isooctyl acrylate, a polymerization inhibitor, an acylphosphine oxide-based photopolymerization initiator, an iodonium salt-type polymerization initiator, 2-(2-vinyloxyethoxy)ethyl acrylate, a dispersant, and an acrylic resin.

In addition, JP-A-2009-57548 discloses a photo curable ink composition including a photopolymerization initiator produced by mixing a dendritic polymer, 2-(vinyloxyethoxy)ethyl acrylate, acylphosphine oxide, and acetophenone.

However, when the ink composition for ultraviolet curable ink jets as disclosed in JP-A-2008-280383 is cured by irradiating ultraviolet rays, there are problems in that the curing properties are degraded, and coloration is observed from the initial phase after recording.

In addition, when the liquid as disclosed in JP-A-2009-226863 is cured by irradiating ultraviolet rays, there are problems in that the curing properties are extremely degraded, and coloration is observed from the initial phase after recording.

In addition, the photo curable ink composition as disclosed in JP-A-2009-57548 has a possibility of improving the discharge stability of the ink, and also has a possibility of improvement in terms of the curing properties when the ink composition is cured by irradiating ultraviolet rays and coloration occurring in the initial phase after recording.

SUMMARY

Therefore, an advantage of some aspects of the invention is to provide an ink composition for ultraviolet curable ink jets which is excellent in terms of the curing properties of the ink and can prevent the coloration of the cured film in the initial phase after recording, and an ink jet recording apparatus using the same.

The present inventors carried out thorough studies in order to solve the problems. Firstly, the inventors found that including a monomer which includes 2-(vinyloxyethoxy) ethyl acrylate that is used in JP-A-2008-280383, JP-A-2009-0226863, and JP-A-2009-57548, and is represented by the following formula (I) (hereinafter referred to as a "monomer A") in an ink decreases the viscosity of the ink and creates a tendency for the curing properties to become favorable since the ink has a high sensitivity with respect to the irradiated ultraviolet rays.

$$CH^2=CR^1-COOR^2-O-CH=CH-R^3 \quad (I)$$

(In the formula, 'R$^1$' represents a hydrogen atom or methyl group, 'R$^2$' represents a divalent organic residue having a carbon number of 2 to 20, and 'R$^3$' represents a hydrogen atom or a monovalent organic residue having a carbon number of 1 to 11.)

However, the inventors found that a variety of problems occurred in the obtained ink when the ink contained only 2-(vinyloxyethoxy)ethyl acrylate. Hereinafter, the findings will be described in detail.

Firstly, since the added amount of the photopolymerization initiator is limited due to the influence of the solubility in the ink, the photopolymerization initiator fails to increase the sensitivity, and therefore the curing properties of the ink are degraded. In this case, if an excessive amount of the photopolymerization initiator is forcibly added, the photopolymerization initiator is precipitated, and, consequently, image defects or poor discharge of the ink are caused.

On the other hand, when the content of the photopolymerization initiator in the ink is below a certain amount, the minimum sensitivity necessary for the ultraviolet curable ink cannot be maintained, and, consequently, the curing properties of the ink are degraded.

Secondly, thorough studies were made regarding the kinds of the photopolymerization initiator for making favorable curing properties of the ink. As a result, the inventors found that use of the combination of an acylphosphine oxide-based photopolymerization initiator (hereinafter referred to also as an acylphosphine-based photopolymerization initiator or an acylphosphine oxide-based photopolymerization initiation) and a thioxanthone-based photopolymerization initiator can make excellent curing properties of the ink, and also prevent the coloration of the cured film in the initial phase after ink jet recording.

When only the acylphosphine-based photopolymerization initiator is included in the ink as the photopolymerization initiator in a sufficient amount for obtaining favorable curing properties, coloration is observed from the initial phase after ink jet recording. On the other hand, when only the thioxanthone-based photopolymerization initiator is included in the ink as the photopolymerization initiator, the curing properties are degraded.

However, surprisingly, it was found that, when both are used in combination, due to the mutual complimentary actions, it is possible to obtain an ink composition for ultraviolet curable ink jets which is favorable in terms of the curing properties of the ink (furthermore, the discharge stability of the ink), and possible to prevent the coloration of the cured film in the initial phase after ink jet recording.

Thirdly, it was confirmed that there are cases in which the curing properties (and discharge stability) of the ink are degraded when the combination of the acylphosphine-based photopolymerization initiator and the thioxanthone-based photopolymerization initiator is included in the ink as described above. Therefore, the inventors carried out more thorough studies, and consequently found that the curing properties of the ink (furthermore, the discharge stability of the ink) are extremely excellent when the total content of the acylphosphine oxide-based photopolymerization initiator and the thioxanthone-based photopolymerization initiator in the ink is within a predetermined range.

From the above facts, the inventors found that the problems can be solved by an ink composition for ultraviolet curable ink jets including a predetermined amount of monomer A and a photopolymerization initiator containing a predetermined amount of the acylphosphine-based photopolymerization initiator and the thioxanthone-based photopolymerization initiator, and completed the invention.

That is, the invention is as follows:

[1] According to a first aspect of the invention, there is provided an ink composition for ultraviolet curable ink jets including monomer A represented by the following formula (I)

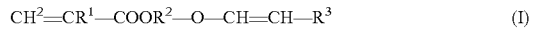

$$CH_2=CR^1-COOR^2-O-CH=CH-R^3 \quad (I)$$

(In the formula, '$R^1$' represents a hydrogen atom or methyl group, '$R^2$' represents a divalent organic residue having a carbon number of 2 to 20, and '$R^3$' represents a hydrogen atom or a monovalent organic residue having a carbon number of 1 to 11), and a photopolymerization initiator containing an acylphosphine oxide-based photopolymerization initiator and a thioxanthone-based photopolymerization initiator, in which the total content of the acylphosphine oxide-based photopolymerization initiator and the thioxanthone-based photopolymerization initiator is 8% by mass to 16% by mass with respect to the total mass of the ink composition.

[2] It is preferable that, in the ink composition for ultraviolet curable ink jets according to [1], the thioxanthone-based photopolymerization initiator include 2,4-diethylthioxanthone.

[3] It is preferable that, in the ink composition for ultraviolet curable ink jets according to [1] or [2], the content of the acylphosphine oxide-based photopolymerization initiator be 8% by mass to 13% by mass with respect to the total mass of the ink composition, and the content of the thioxanthone-based photopolymerization initiator be 1% by mass to 5% by mass with respect to the total mass of the ink composition.

[4] It is preferable that, in the ink composition for ultraviolet curable ink jets according to any one of [1] to [3], the content of the monomer A be 10% by mass to 75% by mass with respect to the total mass of the ink composition.

[5] It is preferable that, in the ink composition for ultraviolet curable ink jets according to any one of [1] to [4], the monomer A be 2-(vinyloxyethoxy)ethyl (meth)acrylate.

[6] It is preferable that the ink composition for ultraviolet curable ink jets according to any one of [1] to [5] contain phenoxyethyl (meth)acrylate.

[7] It is preferable that, in the ink composition for ultraviolet curable ink jets according to any one of [1] to [6], the viscosity at 20° C. be 15 mPa·s or less.

[8] It is preferable that the ink composition for ultraviolet curable ink jets according to any one of [1] to [7] further include a color material.

[9] It is preferable that the ink composition for ultraviolet curable ink jets according to any one of [1] to [8] be curable by irradiating ultraviolet rays having a light emitting peak wavelength in a range of 365 nm to 405 nm at an irradiation energy of 300 mJ/cm$^2$ or less.

[10] According to a second aspect of the invention, there is provided an ink jet recording apparatus provided with nozzles that discharge the ink composition for ultraviolet curable ink jets according to any one of [1] to [9], in which the diameter of the nozzle is 25 μm or less.

[11] According to a third aspect of the invention, there is provided an ink jet recording method in which the ink composition for ultraviolet curable ink jets according to any one of [1] to [9] is discharged through a head having nozzles and attached to a recording medium, and the attached ink composition for ultraviolet curable ink jets is photo-irradiated with irradiation from a light source.

[12] According to a fourth aspect of the invention, there is provided an ink set composed of at least one of the ink composition for ultraviolet curable ink jets according to any one of [1] to [9], and at least any of a white ink composition for ultraviolet curable ink jets including no thioxanthone-based photopolymerization initiator and a clear ink composition for ultraviolet curable ink jets.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments for carrying out the invention will be described in detail. Meanwhile, the invention is not limited to the embodiments, and a variety of modifications are allowed within the scope of the gist of the invention.

In the present specification, "(meth)acrylate" refers to at least any of acrylate and methacrylate corresponding thereto, and "(meth)acryl" refers to at least any of acryl and methacryl corresponding thereto.

In the specification, "curing properties" refer to properties of being polymerization-cured by irradiation of light in presence or absence of a photopolymerizable initiator. "Discharge stability" refers to properties of discharging stabilized ink droplets at all times from nozzles without clogging of the nozzles.

In addition, in the specification, "color ink" refers to so-called colored inks which do not include colorless and transparent clear inks. "Primary curing" refers to curing dots formed on a recording medium to a cured state necessary for using printed objects. "Preliminary curing" refers to pinning of an ink, which means curing performed before primary curing to prevent the bleed or color mixing of dots, and, generally, the inversion rate during preliminary curing is lower than the inversion rate by primary curing performed after the preliminary curing. Meanwhile, the inversion rate refers to a rate of inverting a polymerizable compound included in an ink composition to a cured object, and can be called the degree of curing of an ink composition by light irradiation.

Figure 1:
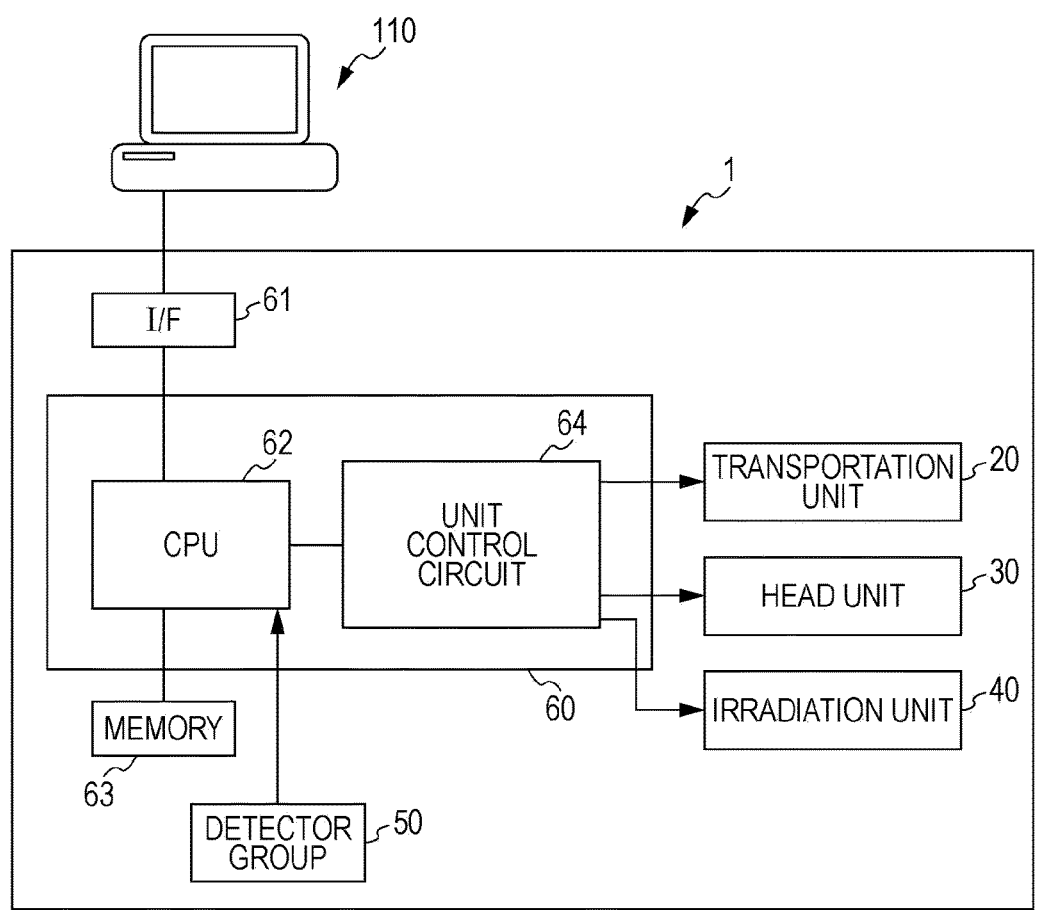
FIG. 1 is a block diagram showing the configuration of a line printer which is an example of the recording apparatus used in a first embodiment of the invention.

In the specification, "ink jet recording apparatus" refers to an apparatus that forms images on a recording medium by an ink jet mode, and includes, for example, the printer 1 which is shown in FIG. 1 and described below. In addition, a recording control apparatus refers to an apparatus that controls a recording apparatus, and includes, for example, a computer 110 that is described below and has a printer driver installed.

In the specification, "ink jet recording method" refers to a method of ejecting an ink from ink jet nozzles to a recording medium so as to form images.

Ink Composition for Ultraviolet Curable Ink Jets

An embodiment of the invention relates to an ink composition for ultraviolet curable ink jets. The ink composition for ultraviolet curable ink jets is an ink composition for ultraviolet curable ink jets including a monomer A represented by the above general formula (I) and a photopolymerization initiator containing an acylphosphine oxide-based photopolymerization initiator and a thioxanthone-based photopolymerization initiator, in which the total content of the acylphosphine oxide-based photopolymerization initiator and the thioxanthone-based photopolymerization initiator is 8% by mass to 16% by mass with respect to the total mass of the ink composition.

Hereinafter, additives (components) that can be included or not included in the ink composition for ultraviolet curable ink jets of the embodiment (hereinafter also referred to simply as an "ink composition") will be described.

Polymerization Compound

A polymerization compound included in the ink composition of the embodiment is polymerized by the action of a photopolymerization initiator as described below during irradiation or ultraviolet rays, and can cure the printed ink.

Monomer a

The monomer A, which is an essential polymerizable compound in the embodiment, is a vinyl ether group-containing ester (meth)acrylate, and is represented by the following general formula (I).

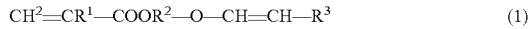

$$CH^2=CR^1-COOR^2-O-CH=CH-R^3 \quad (1)$$

(In the formula, 'R$^1$' represents a hydrogen atom or methyl group, 'R$^2$' represents a divalent organic residue having a carbon number of 2 to 20, and 'R$^3$' represents a hydrogen atom or a monovalent organic residue having a carbon number of 1 to 11.)

Containing the monomer A in the ink composition can make favorable curing properties of the ink.

In the general formula (I), the preferred divalent organic residue which is represented by R$^2$ and has a carbon number of 2 to 20 includes straight-chain, dendritic, or cyclic alkylene groups having a carbon number of 2 to 20, alkylene groups having oxygen atoms in the structure by ether bonding and/or ester bonding, and a carbon number of 2 to 20, and divalent aromatic groups which have a carbon number of 6 to 11, and may be substituted. Among the above, alkylene groups having a carbon number of 2 to 6, such as an ethylene group, a n-propylene group, an isopropylene group, and a butylene group, alkylene groups which have oxygen atoms in the structure by ether bonding, and has a carbon number of 2 to 9, such as an oxyethylene group, an oxy n-propylene group, an oxyisopropylene group, and an oxybutylene group, are preferably used.

In the general formula (I), the preferred monovalent organic residue which is represented by R$^3$ and has a carbon number of 1 to 11 includes straight-chain, dendritic, or cyclic alkyl groups having a carbon number of 1 to 10, and aromatic groups which have a carbon number of 6 to 11, and may be substituted. Among the above, alkyl groups having a carbon number of 1 to 2, which are methyl groups or ethyl groups, and aromatic groups having a carbon number of 6 to 8, such as a phenyl group and a benzyl group, are preferably used.

When the organic residue is a group which may be substituted, the substituent is classified into a group including a carbon atom and a group including no carbon atoms. Firstly, when the substituent is a group including a carbon atom, the carbon atom is counted in the carbon number of the organic residue. The group including a carbon atom is not limited to the following, but includes, for example, a carboxylic group, an alkoxy group, and the like. Next, the group including no carbon atoms is not limited to the following, but includes, for example, a hydroxide group, and a halo group.

The monomer A is not limited, and examples of the monomer A include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxibutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)proxyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isoprophenoxyethoxy)ethyl (meth)acrylate, 2-(isoprophenoxyethoxyethoxy)ethyl (meth)acrylate, 2-(isoprophenoxyethoxyethoxyethoxy)ethyl (meth)acrylate, 2-(isoprophenoxyethoxyethoxyethoxyethoxy)ethyl (meth)acrylate, polyethylene glycol monovinyl ether (meth)acrylate, and polypropylene glycol monovinyl ether (meth)acrylate.

Among the above, due to a low viscosity, a high flash point, and excellent curing properties, 2-(vinyloxyethoxy)ethyl (meth)acrylate, that is, at least any of 2-(vinyloxyethoxy)ethyl acrylate and 2-(vinyloxyethoxy)ethyl methacrylate is preferred, and 2-(vinyloxyethoxy)ethyl acrylate is more preferred. 2-(vinyloxyethoxy)ethyl (meth)acrylate includes 2-(2-vinyloxyethoxy)ethyl (meth)acrylate, and 2-(1-vinyloxyethoxy)ethyl (meth)acrylate, and 2-(vinyloxyethoxy)ethyl acrylate includes 2-(2-vinyloxyethoxy)ethyl acrylate (hereinafter referred to as "VEER") and 2-(1-vinyloxyethoxy)ethyl acrylate.

The content of the monomer A is not limited; however, with respect to the total mass of the ink composition (100% by mass), the content can be 10% by mass to 75% by mass, is preferably in a range of 40% by mass to 75% by mass, particularly preferably in a range of 55% by mass to 75% by mass, and more preferably in a range of 65% by mass to 70% by mass. When the content is within the above ranges, the curing properties and discharge stability of the ink are excellent.

The method of manufacturing the monomer A is not limited, and includes a method of esterifying (meth)acrylate and hydroxyl group-containing vinyl ether (manufacturing method B), a method of esterifying (meth)acrylate halide and hydroxyl group-containing vinyl ether (manufacturing method C), a method of esterifying (meth)acrylate anhydride and hydroxyl group-containing vinyl ether (manufacturing method D), a method of esterifying (meth)acrylate ester and halogen-containing vinyl ether (manufacturing method E), a method of esterifying (meth)acrylate ester and halogen-containing vinyl ether (manufacturing method F), a method of esterifying (meth)acrylate alkali (earth) metallic salt and halogen-containing vinyl ether (manufacturing method G), a method of vinyl-exchanging hydroxyl group-containing (meth)acrylate ester and carboxylic acid vinyl (manufacturing method H), and a method of ether-exchanging hydroxyl group-containing (meth)acrylate ester and alkyl vinyl ether (manufacturing method I).

Among the above, the manufacturing method E is preferred since a desired effect can be further exhibited in the present embodiment.

Polymerizable Compounds Other than the Monomer A

In addition, it is also possible to use a variety of monofunctional, difunctional, trifunctional, and other multifunctional monomers and oligomers that are well-known (hereinafter, referred to as 'other polymerizable compounds') in addition to the vinyl ether group-containing (meth)acrylate ester (monomer A). Examples of the monomers include unsaturated carboxylic acid, such as (meth)acrylic acid, itaconic acid, crotonic acid, isocrotonic acid, and maleic acid, salts thereof, ester, urethane, amide, anhydrides thereof, acrylonitrile, styrene, a variety of unsaturated polyesters, unsaturated polyethers, unsaturated polyamides, and unsaturated urethane. In addition, examples of the oligomers include oligomers formed from the monomers, such as straight-chain acryl oligomers, epoxy (meth)acrylate, oxetane (meth)acrylate, aliphatic urethane (meth)acrylate, aromatic urethane (meth)acrylate, and polyester (meth)acrylate.

In addition, N-vinyl compounds may be included as the other monofunctional monomers or multifunctional monomers. The N-vinyl compounds include N-vinylform amide, N-vinylcarbazole, N-vinyl acetamide, N-vinylpyrrolidone, N-vinyl caprolactam, acryloylmorpholine, and derivatives thereof.

Among the other polymerizable compounds, an ester of (meth)acrylate, that is, (meth)acrylate is preferred.

Among the (meth)acrylate, examples of the monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl (meth)acrylate, 2-hydroxybutyl (meth)acrylate, butoxyethyl (meth)acrylate, ethoxy diethylene glycol (meth)acrylate, methoxy diethyl glycol (meth)acrylate, methoxy polyethylene glycol (meth)acrylate, methoxy propylene glycol (meth)acrylate, phenoxydiethyl (meth)acrylate, tetrahydrofurfuryl (meth)acrylate, isobornyl (meth)acrylate, 2-hydroxyethyl (meth)acrylate, 2-hydroxy propyl (meth)acrylate, 4-hydroxybutyl (meth)acrylate, 2-hydroxy-3-phenoxypropyl (meth)acrylate, lactone-modified flexible (meth)acrylate, t-butylcyclohexyl (meth)acrylate, dicyclopentanyl (meth)acrylate, and dicyclopentanyl oxyethyl (meth)acrylate.

Among the (meth)acrylate, examples of difunctional (meth)acrylate include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butandiol di(meth)acrylate, dicyclopentanyl di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalate neopentyl glycol di(meth)acrylate, polytetramethylene glycol di(meth)acrylate, and acrylate compounds obtained by reacting 1,6-hexandiol di(meth)acrylate and amine compounds. Meanwhile, the commercially available products of the acrylate compounds obtained by reacting 1,6-hexanediol di(meth)acrylate and amine compounds include EBECRYL 7100 (a compound containing two amino groups and two acryloyl groups, product name manufactured by Cytech, Inc.) and the like.

Among the (meth)acrylate, examples of tri or more-functional (meth)acrylate include trimethylol propane tri(meth)acrylate, EO-modified trimethylol propane tri(meth)acrylate, pentaerithrithol tri(meth)acrylate, isocyanurate EO-modified tri(meth)acrylate, pentaerithrithol tetra(meth)acrylate, dipentaerithrithol hexa(meth)acrylate, ditrimethylol propane tetra(meth)acrylate, glycerine propoxy tri(meth)acrylate, caprolactone-modified trimethylol propane tri(meth)acrylate, pentaerithrithol ethoxy tetra(meth)acrylate, and caprolactam-modified dipentaerithrithol hexa(meth)acrylate.

In addition, among the above, the other polymerizable compound preferably includes monofunctional (meth)acrylate. In this case, the viscosity of the ink composition is decreased, the solubility of the photopolymerization initiator and the other additives is excellent, and the discharge stability during ink jet recording can be easily obtained. Furthermore, it is preferred to jointly use monofunctional (meth)acrylate and divalent (meth)acrylate since the strong toughness, heat resistance, and chemical resistance of the ink-coated film are increased.

Furthermore, the monofunctional (meth)acrylate preferably has one or more of skeletons selected from a group consisting of an aromatic skeleton, a saturated alicyclic skeleton, and an unsaturated alicyclic skeleton. When the other polymerizable compound is monofunctional (meth)acrylate having the above skeleton, it is possible to decrease the viscosity of the ink composition.

Examples of the monofunctional (meth)acrylate having an aromatic skeleton include phenoxyethyl (meth)acrylate and 2-hydroxy-3-phenoxypropyl (meth)acrylate. In addition, example of the monofunctional (meth)acrylate having a saturated alicyclic skeleton include isobornyl (meth)acrylate, t-butylcyclohexyl (meth)acrylate, and dicyclopentanyl (meth)acrylate. In addition, examples of the monofunctional (meth)acrylate having an unsaturated alicyclic skeleton include dicyclopentenyloxyethyl (meth)acrylate.

Among the above, phenoxyethyl (meth)acrylate is preferred since it is possible to degrade the viscosity and order, and the solubility of the photopolymerization initiator is also excellent.

The content of the polymerizable compounds other than the monomer A is not limited; however, with respect to the total mass of the ink composition (100% by mass), the content can be set to 10% by mass to 75% by mass, is preferably set to 10% by mass to 55% by mass, and more preferably to 10% by mass to 35% by mass. When the content is within the above ranges, the strong toughness, heat resistance, and chemical resistance of the ink-coated film are excellent.

In addition, when the polymerizable compound other than the monomer A contains phenoxyethyl (meth)acrylate; however, with respect to the total mass of the ink composition (100% by mass), the content can be set to 4% by mass to 55% by mass, and is preferably set to 10% by mass to 55% by mass. When the content is within the above ranges, the solubility of the photopolymerization initiator is excellent, and it is possible to obtain superior curing properties and discharge stability of the ink.

The polymerizable compound may be used singly, or in combination of two or more kinds.

Photopolymerizable Initiator

The photopolymerization initiator included in the ink composition of the embodiment is used to cure the ink present on the surface of a recording medium by photopolymerization by irradiation of ultraviolet rays so as to form printing. Among radiant rays, use of ultraviolet rays (UV) can obtain excellent stability and suppress the cost of a light source lamp.

The photopolymerization initiator contains an acylphosphine oxide-based photopolymerization initiator and a thioxanthone-based photopolymerization initiator as described above. Thereby, it is possible to make excellent curing properties of the ink, and also prevent coloration of the cured film in the initial phase after ink jet recording.

In addition to the above, the total content of the acylphosphine oxide-based photopolymerization initiator and the thioxanthone-based photopolymerization initiator is 8% by mass to 16% by mass, preferably 10% by mass to 16% by mass, and more preferably 11% by mass to 16% by mass with respect to the total mass of the ink composition (100% by mass) as described above. When the total content in the ink is within the ranges, the curing properties and discharge stability of the ink are extremely excellent. Particularly, when the content is 9% by mass or more, the curing properties of the ink are particularly excellent. In addition, the viscosity becomes relatively large, and the discharge stability of the ink is excellent since an increase in mist, which is a cause of contamination of images, can be prevented. Meanwhile, the total content of the acylphosphine oxide-based photopolymerization initiator and the thioxanthone-based photopolymerization initiator is preferably 14% by mass or less with respect to the total mass of the ink composition (100% by mass) since the discharge stability can be more favorable.

Acylphosphine Oxide-Based Photopolymerization Initiator

The photopolymerization initiator in the embodiment includes an acylphosphine oxide-based photopolymerization initiator, that is, an acylphosphine oxide-based photopolymerization initiator (hereinafter also referred to simply as "acylphosphine oxide"). Thereby, particularly the curing properties of the ink are excellent, coloration of the cured film in the initial phase after ink jet recording and coloration after time-keeping of the cured-film can be prevented (the degree of the initial coloration of the cured film is decreased).

The acylphosphine oxide is not particularly limited, but examples thereof include 2,4,6-trimethyl benzoyl-diphenyl phosphine oxide, 2,4,6-triethylbenzoyl-diphenylphosphine oxide, 2,4,6-triphenylbenzoyl-diphenylphosphine oxide, bis (2,4,6-trimethylbenzoyl)-phenylphosphine oxide, and bis(2, 4,6-dimethoxy benzoyl)-2,4,4-trimethylpentyl phosphine oxide.

Examples of the commercially available products of the acylphosphine oxide-based photopolymerization initiator include DAROCUR TPO (2,4,6-trimethylbenzoyl-diphenylphosphine oxide), IRGACURE 819 (bis(2,4,6-trimethylbenzoyl)-phenylphosphine oxide), and CGI 403 (bis(2,6-dimethoxy benzoyl)-2,4,4-trimethylpentyl phosphine oxide).

In addition, the acylphosphine oxide preferably includes monoacylphosphine oxide. Thereby, the photopolymerization initiator is sufficiently dissolved so that curing sufficiently proceeds, and the curing properties of the ink are excellent.

The monoacylphosphine oxide is not particularly limited, but examples thereof include 2,4,6-trimethyl benzoyl-diphenyl phosphine oxide, 2,4,6-triethylbenzoyl-diphenylphosphine oxide, and 2,4,6-triphenylbenzoyl-diphenylphosphine oxide. Among the above, 2,4,6-trimethylbenzoyl-diphenylphosphine oxide is preferred.

Examples of the commercially available products of the monoacylphosphine oxide include DAROCUR TPO (2,4,6-trimethylbenzoyl-diphenylphosphine oxide).

Since the photopolymerization initiator in the embodiment is excellent in terms of the solubility in the polymerizable compounds and the internal curing properties of the ink-coated film, and the degree of coloration in the initial phase becomes small, monoacylphosphine oxide or a mixture of monoacylphosphine oxide and bisacylphosphine oxide is preferred.

Meanwhile, the bisacylphosphine is not particularly limited, but examples thereof include bis(2,4,6-trimethylbenzoyl)-phenylphosphine oxide and bis(2,6-dimethoxylbenzoyl)-2,4,4-trimethylpentyl phenylphosphine oxide. Among them, bis(2,4,6-trimethylbenzoyl)-phenylphosphine oxide is preferred.

The content of the acylphosphine oxide is preferably in a range of 7% by mass to 13% by mass, more preferably 9% by mass to 13% by mass, and particularly preferably 10% by mass to 13% by mass with respect to the total mass of the ink composition (100% by mass). When the content is within the ranges, the curing properties of the ink are excellent, and the degree of the initial coloration of the cured film is small.

Thioxanthone-Based Photopolymerization Initiator

The photopolymerization initiator in the embodiment includes the thioxanthone-based photopolymerization initiator (hereinafter also referred to simply as "thioxanthone"). Thereby, the curing properties of the ink are excellent, and, particularly, the degree of the initial coloration of the cured film becomes small. Examples of the thioxanthone include 2,4-diethylthioxanthone, 2-isopropylthioxanthone, 4-isopropylthioxanthone, and the like.

Among the thioxanthone, 2,4-diethylthioxanthone is preferred since the effect of sensitization to acylphosphine oxide, the solubility with respect to the polymerizable compound, and the safety are excellent.

Examples of the commercially available products of the thioxanthone include KAYACURE DETX-S (2,4-diethylthioxanthone) (product name manufactured by Nippon Kayaku Co., Ltd.), ITX (manufactured by BASF), Quantacure CTX (manufactured by Aceto Chemical Corporation), KAYACURE ITX (2-/4-isopropylthioxanthone) mixture, product name manufactured by Nippon Kayaku Co., Ltd.), and the like.

The content of the thioxanthone is preferably in a range of 1% by mass to 5% by mass, and more preferably 2% by mass to 5% by mass with respect to the total mass of the ink composition (100% by mass). When the content is within the ranges, the curing properties of the ink are excellent, and the degree of the initial coloration of the cured film becomes small.

The photopolymerization initiator may further contain photopolymerization initiators other than the acylphosphine oxide-based photopolymerization initiator and the thioxanthone-based photopolymerization initiator.

Color Material

The ink composition of the embodiment may further include a color material. At least either of a pigment and a dye can be used as the color material.

Pigment

In the embodiment, use of a pigment as the color material can improve the heat resistance of the ink composition. Any of an inorganic pigment and an organic pigment can be used as the pigment.

Carbon blacks (C.I. pigment black 7), such as Furnace black, Lamp black, acetylene black, and channel black, iron oxide, titanium oxide can be used as the inorganic pigment.

The organic pigment includes azo pigments, such as an insoluble azo pigment, a condensed azo pigment, azolake, and a chelate azo pigment; polycyclic pigments, such as a phthalocyanine pigment, a perylene pigment, a perinone pigment, an anthraquinone pigment, a quinacridone pigment, a dioxadine pigment, a thioindigo pigment, an isoindolinone pigment, a quinophthalone pigment; pigment chelates (for example, a basic pigment-type chelate, an acidic pigment-type chelate, and the like), dye chelates (a basic dye-type lake and an acidic dye-type lake), nitro pigments, nitroso pigments, aniline black, and a fluorescence pigment.

More specifically, carbon black used as a black ink includes No. 2300, No. 900, MCF 88, No. 33, No. 40, No. 45, No. 52, MA7, MA8, MA100, No. 2200B, and the like (product names manufactured by Mitsubishi Chemical Corporation), Raven 5750, Raven 5250, Raven 5000, Raven 3500, Raven 1255, Raven 700, and the like (product names manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (product names manufactured by Cabot Japan K.K.), Color Black FW1, Color Black FW2, Color Black FW2V, Color Black FW18, Color Black FW200, Color Black 5150, Color Black S160, Color Black 5170, Pintex 35, Printex U, Printex V, Printex 140U, Special Black 6, Special Black 5, Special Black 4A, Special Black 4, and the like (product names manufactured by Degussa AG).

Pigments used in the white ink include a C.I. pigments white 6, 18, and 21. In addition, metal atom-containing compounds that can be used as the white pigment can be also used, and examples thereof include metal oxides, barium sulfate, and calcium carbonate previously used as a white pigment. The metal oxide is not particularly limited, and examples thereof include titanium dioxide, zinc oxide, silica, alumina, magnesium oxide, and the like.

Pigments used in the yellow ink include C.I. pigments yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Pigments used in the magenta ink include C.I. pigments red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, 245, and C.I. pigments violet 19, 23, 32, 33, 36, 38, 43, 50.

Pigments used in the cyan ink include C.I. pigments blue 1, 2, 3, 15, 15:1, 15:2, 15:3, 15:34, 15:4, 16, 18, 22, 25, 60, 65, 66, and C.I. vats blue 4, 60.

Examples of pigments other than magenta, cyan, and yellow include C.I. pigments green 7, 10, C.I. pigments brown 3, 5, 25, 26, C.I. pigments orange 1, 2, 5, 7, 13, 14, 15, 16, 24, 34, 36, 38, 40, 43, and 63.

The pigment may be used singly, or in combination of two or more kinds.

When the pigment is used, the average particle diameter is preferably 2 μm or less, and more preferably 30 nm to 300 nm. When the average particle diameter is within the above ranges, the reliability, such as the discharge stability or dispersion stability, in the ink composition is superior, and it is also possible to form images having excellent qualities. Here, the average particle diameter in the specification is measured by the dynamic light scattering method.

Dye

A dye can be used as a color material in the embodiment. The dye is not particularly limited, and an acidic dye, a direct dye, a reactive dye, and a basic dye can be used. Examples of the dye include C.I. acid yellow 17, 23, 42, 44, 79, 142, C.I. acid red 52, 80, 82, 249, 254, 289, C.I. acid blue 9, 45, 249, C.I. acid black 1, 2, 24, 94, C.I. food black 1, 2, C.I. direct yellow 1, 12, 24, 33, 50, 55, 58, 86, 132, 142, 144, 173, C.I. direct red 1, 4, 9, 80, 81, 225, 22, C.I. direct blue 1, 2, 15, 71, 86, 87, 98, 165, 199, 202, C.I. direct black 19, 38, 51, 71, 154, 168, 171, 195, C.I. reactive red 14, 32, 55, 79, 249, C.I. reactive black 3, 4, 35.

The pigment may be used singly, or in combination of two or more kinds.

The content of the color material is in a range of 1.5% by mass to 6% by mass in the case of CMYK, and in a range of 15% by mass to 30% by mass in the case of W with respect to the total mass of the ink composition (100% by mass) since the color material is favorably chromic, and the curing hindrance of the ink-coated film by the light absorption of the color material can be reduced.

Dispersant

When the ink composition of the embodiment includes the pigment, the ink composition may further include a dispersant in order to obtain a more favorable pigment dispersibility. The dispersant is not particularly limited, and examples thereof include dispersants that are typically used to prepare pigment dispersants, such as a polymer dispersant. Specific examples thereof include dispersants including as the main component one or more of polyoxyalkylene polyalkylene polyamine, a vinyl-based polymer and copolymer, an acryl-based polymer and copolymer, polyester, polyamide, polyimide, polyurethane, an amine-based polymer, a silicon-containing polymer, a sulfur-containing polymer, a fluorine-containing polymer, and an epoxy resin.

The commercially available polymer dispersant includes Aji Super series, manufactured by Ajinomoto Fine-Techno Co., Inc. (product name), Solsperse 36000 and the like purchasable from Lubrizol Corporation, Disperbyk (product name), manufactured by BYK Chemie, and Disparlon (product name), manufactured by Kusumoto Chemicals, Ltd.

Leveling Agent

The ink composition of the embodiment may further include a leveling agent (surfactant) since the wettability in a printing base material becomes favorable. The leveling agent is not particularly limited; however, for example, it is possible to use polyester-modified silicone or polyether-modified silicone as a silicone-based surfactant, and it is particularly preferable to use polyether-modified polydimethylsiloxane or polyester-modified polydimethylsiloxane. Specific examples include BYK-347, BYK-348, BYK-UV3500, 3510, 3530, 3570 (product names, manufactured by BYK Japan K.K.).

Polymerization Inhibitor

The ink composition of the embodiment may further include a polymerization inhibitor in order to obtain favorable storage stability of the ink composition. The polymerization inhibitor is not particularly limited, and examples of the polymerization inhibitor that can be used include IRGASTAB UV10, UV22 (manufactured by BASF), and hydroquinone monomethyl ether (MEHQ, product name manufactured by Kanto Chemical Co., Inc.).

Other Additives

The ink composition of the embodiment may include additives (components) other than the additives as described above. The components are not particularly limited, but possible examples thereof include a polymerization accelerator, an infiltration accelerator, a wetting agent (moisturizing agent), and other additives, which are well-known. Examples of the other additives include a fixing agent, a fungicide, a preservative agent, an oxidation inhibitor, an ultraviolet ray absorbent, a chelate agent, a pH adjuster, and a thickening agent, which are well-known.

Properties of the Ink Composition for Ultraviolet Curable Ink Jets

The viscosity of the ink composition of the embodiment at 20° C. is preferably 15 mPa·s or less, and more preferably 9 mPa·s to 14 mPa·s. When the viscosity is within the above ranges, the solubility of the photopolymerization initiator and the other additives is excellent, and the discharge stability during ink jet recording can be easily obtained. Meanwhile, the viscosity in the specification is a value measured using RHEOMETER MCR300, manufactured by DKSH Japan K.K.

In addition, it is preferable that the ink composition of the embodiment be curable by irradiating ultraviolet rays having a light emitting peak wavelength in a range of 365 nm to 405 nm with an irradiation energy of 300 mJ/cm$^2$ or less. Since the ink composition of the embodiment can be cured by irradiating a low irradiation energy of 300 mJ/cm$^2$ or less, a variety of advantageous effects are exhibited. The cumulative light intensity (irradiation energy) [mJ/cm$^2$] is computed from the product of the irradiation intensity [mW/cm$^2$] in a surface irradiated from a light source and the irradiation duration [s]. A small cumulative light intensity leads to a decrease in costs particularly when the irradiation intensity is small, and an increase in the printing rate, that is, shortening of the printing time particularly when the irradiation duration is short. Among them, since an industrial ink jet recording apparatus requires the shortening of the printing time, the ink composition of the embodiment can exhibit advantageous effects in the field of industrial printing. The light emitting peak of an ultraviolet ray is more preferably 385 nm to 400 nm, and the irradiation energy is more preferably 100 mJ/cm$^2$ to 200 mJ/cm$^2$. Meanwhile, the cumulative light intensity (irradiation energy) in the specification is measured by the method used in the examples as described below.

As described above, the content of the monomer A in the ink composition of the embodiment is 40% by mass to 75% by mass. When the content is below the minimum value of 40% by mass, the minimum sensitivity necessary for an ultraviolet curable ink cannot be maintained, and, consequently, the curing properties of the ink are degraded. In this case, since the ink needs to be cured by an irradiation energy of 350 mJ/cm$^2$ or more in order to obtain favorable curing properties, a large irradiation energy is required, and the irradiation apparatus becomes large such that a machine becomes large, the costs are increased, or significant running costs are required.

As such, unlike the inks in the related art, the ink composition of the embodiment is an ink that can be sufficiently cured even with a low irradiation energy.

Recording Medium

The ink composition for ultraviolet curable ink jets of the embodiment is discharged on a recording medium by the recording method as described below so as to produce recorded objects. Examples of the recording medium include absorbent or non-absorbent recording media. The recording method in the embodiments below can be applied to a wide range of recording media having a variety of absorption performances from the non-absorbent recording media into which an aqueous ink composition cannot easily infiltrate to the absorbent recording medium into which an aqueous ink composition can easily infiltrate. However, when the ink composition is applied to the non-absorbent recording medium, there are cases in which it is necessary to provide a drying process and the like after the ink composition is cured by irradiating ultraviolet rays.

The absorbent recording medium is not particularly limited, but examples thereof include standard paper, such as electrophotographing paper having a high permeability of an aqueous ink, ink jet paper (ink jet printing paper provided with an ink absorption layer composed of silica particles or alumina particles, or an ink absorption layer composed of a hydrophilic polymer, such as polyvinyl alcohol (PVA) or polyvinylpyrrolidone (PVP)), art paper that has a relatively small permeability of anhydrophilic polymers and is used for ordinary offset printing, coated paper, cast paper, and the like.

The non-absorbent recording medium is not particularly limited, but examples thereof include plastic films or plates, such as polyvinyl chloride (PVC), polyethylene, polypropylene, and polyethylene terephthalate (PET); metal plates, such as iron, silver, gold, and aluminum; metal plates or plastic films manufactured by deposition of a variety of metals; alloy plates, such as stainless steel or brass; and the like.

Ink Set

An embodiment of the invention relates to an ink set. An ultraviolet curable ink jet ink composition that composes the ink set can be an ink set composed of at least one of the ultraviolet curable ink jet ink compositions as described above and, separately from the ultraviolet curable ink jet ink composition, at least any of an ultraviolet curable ink jet white ink composition and an ultraviolet curable ink jet clear ink composition.

The ultraviolet curable ink jet ink composition that composes the ink set is an ink composition other than the white ink composition and the clear ink composition, and examples thereof include a cyan ink composition, a magenta ink composition, a yellow ink composition, a black ink composition, and the like.

The white ink composition is an ink composition containing a pigment used for the white ink, and the clear ink composition is a colorless and transparent ink composition.

Particularly, the ultraviolet curable ink jet white ink composition and the ultraviolet curable ink jet clear ink composition that compose the ink set can be an ink composition that does not contain the thioxanone-based photopolymerization initiator containing the ultraviolet curable ink jet ink composition. This is because the ultraviolet curable ink jet white ink composition and the ultraviolet curable ink jet clear ink composition generally have better curing properties than the ultraviolet curable ink jet ink compositions of a yellow ink, a magenta ink, a cyan ink, and a black ink.

In addition, the ultraviolet curable ink jet white ink composition and the ultraviolet curable ink jet clear ink composition that compose the ink set include a photopolymerization initiator other than the thioxanthone-based photopolymerization initiator, and the kind and content thereof are not particularly limited; however, particularly, the acylphosphine oxide-based photopolymerization initiator included in the ultraviolet curable ink jet ink composition is included preferably in a range of 8% by mass to 13% by mass, more preferably in a range of 9% by mass to 13% by mass, and particularly preferably in a range of 10% by mass to 13% by mass with respect to the total mass of the ink composition (100% by mass). When the content is within the above ranges, the curing properties and discharge stability of the ink are excellent, and the degree of initial coloration of the cured-film is small.

Other than the above configuration, the ultraviolet curable ink jet white ink composition and the ultraviolet curable ink jet clear ink composition that compose the ink set can have the same configuration as the configuration of the above ultraviolet curable ink jet ink composition, and, particularly, it is preferable to include the monomer A. The content thereof is not particularly limited, but can be set to 10% by mass to 75% by mass, and is preferably in a range of 40% by mass to 75% by mass, and more preferably in a range of 40% by mass to 70% by mass with respect to the total mass of the ink composition (100% by mass). When the content is within the above ranges, the curing properties and discharge stability of the ink are excellent.

The maximum difference between the content of the monomer A in the ultraviolet curable ink jet ink composition that composes the ink set and the content of the monomer A in the ultraviolet curable ink jet white ink composition and the ultraviolet curable ink jet clear ink composition is particularly preferably within 10% by mass. When the difference is within this range, the differences in the curing properties or viscosity between the respective inks in the ink set can be reduced, and, particularly, the recording apparatus or the recording method can be simplified when being used as an ink jet ink set, which is preferred.

Ink Jet Recording Apparatus

An embodiment of the invention relates to an ink jet recording apparatus. The ink jet recording apparatus can be reduced in the size and cost, and has a characteristic of excellent image quality. The ink jet recording apparatus is provided with a head having nozzles whose radius is 25 μm or less, from which the ink composition for ultraviolet curable ink jets of the above embodiment is discharged.

Hereinafter, the ink jet recording apparatus among the recording apparatuses will be described in detail.

Figure 2:
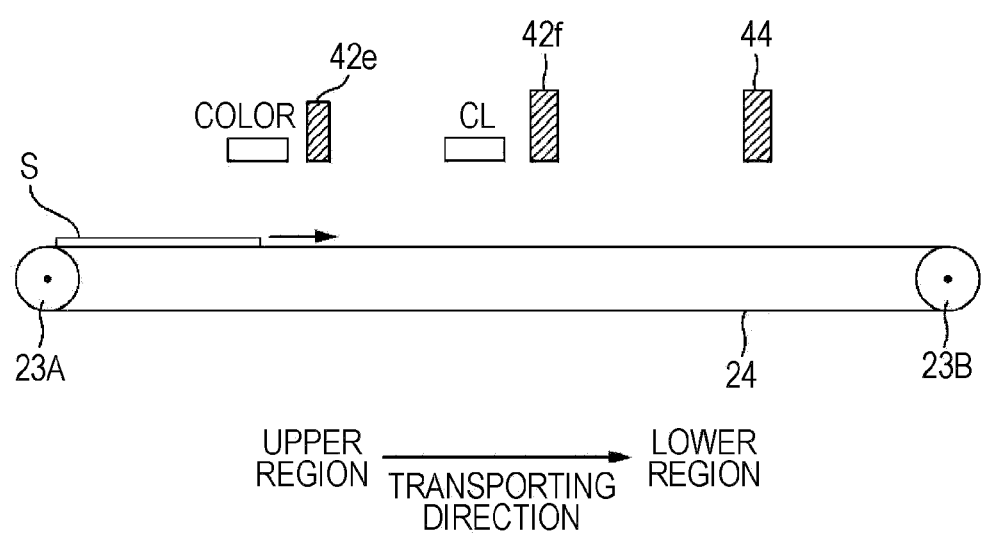
FIG. 2 is a schematic view of the periphery of a recording region in an embodiment of the line printer in FIG. 1.

FIG. 1 is a block diagram showing the configuration of a line printer which is an example of the recording apparatus used in a first embodiment of the invention. FIG. 2 is a schematic view of the periphery of a recording region in an embodiment of the line printer in FIG. 1.

1. Apparatus Configuration

As shown in FIG. 1, a printer 1 of the embodiment is communicably connected with a computer 110, which is an external apparatus.

The printer 1 is an ink jet recording apparatus in which an ultraviolet curable ink composition, which is cured by irradiation of light (ultraviolet rays), is discharged so as to form images on a recording medium. At least one of ultraviolet curable ink compositions that are used in the ink jet recording apparatus is the ink composition for ultraviolet curable ink jets of the above embodiment.

Meanwhile, "on the recording medium" in the specification refers to locations on the surface of the recording medium and above the surface.

The printer 1 (ink jet recording apparatus) is provided with a transportation unit 20 (transportation section) that transports a recording medium in a transportation direction, a part of a head unit 30 that discharges an ultraviolet color ink composition to the recording medium (first print head), a part of an irradiation unit 40 that cures a first coated film composed of the color ink composition landed on the recording medium by first light irradiation (first preliminary curing irradiation section), a part of a head unit 30 that is disposed on the lower region side of the first preliminary curing irradiation section in the transportation direction and discharges an ultraviolet curable clear ink composition to at least a part of the first coated film (second print head), a part of the irradiation unit 40 that preliminarily cures the preliminarily cured first coated film and a second coated film composed of the clear ink composition landed on at least a part of the first coated film by second light irradiation (second preliminary curing irradiation section), and a part of the irradiation unit 40 that primarily cures the preliminarily cured first coated film and the preliminarily cured second coated film by light irradiation from a light source for primary curing (primary curing irradiation section). In addition to the above, the printer 1 (ink jet recording apparatus) arbitrarily has a detector group 50 and a controller 60.

Meanwhile, both the first light irradiation and the second light irradiation refer to light irradiation from a light source for preliminary curing.

The transportation unit 20 is to transport a recording medium in a transportation direction. The transportation unit 20 has, for example, an upper region side transportation roller 23A, a lower region side transportation roller 23B, and a belt 24 as shown in FIG. 2.

The head unit 30 is to discharge an ultraviolet curing ink composition toward a recording medium.

The irradiation unit 40 is to irradiate light toward dots of the ultraviolet curable ink composition landed on a recording medium S. The irradiation unit 40 of the embodiment is provided with a first preliminary curing irradiation section 42e, a second preliminary curing irradiation section 42f, and the primary curing irradiation section 44 in the state of FIG. 2 as described below since the irradiation unit can suppress bleeding and prevent color mixing.

The detector group 50 is provided with a rotary-type encoder (not shown), a paper detecting sensor (not shown), and the like according to necessity.

The controller 60 is a control section for carrying out the control of the printer, and the controller 60 has an interface section 61, a CPU 62, a memory 63, and an unit control circuit 64. The interface section 61 is to send and receive data between the computer 110, which is an external apparatus, and the printer 1. The CPU 62 is an arithmetic processing unit for carrying out the control of the entire printer. The memory 63 is to secure areas for accommodating the programs of the CPU 62, operation areas, and the like, and has a memory element, such as a RAM or an EEPROM. The unit control circuit 64 is to control the respective units (respective sections) based on the control of the CPU 62 following the programs accommodated in the memory 63.

As described above, the printer 1 is configured to be capable of forming images (capable of carrying out printing) using at least the previously discharged ultraviolet curable color ink composition (hereinafter also referred to simply as the "color ink composition") and the later discharged ultraviolet curable clear ink composition (hereinafter also referred to simply as the "clear ink composition").

FIG. 2 is a view schematically showing the configuration related to printing in the printer 1. FIG. 2 exemplifies an embodiment in which the color ink composition is composed of one or a combination of two or more colors. When the color ink composition is composed of a combination of two or more of colors in the embodiment of FIG. 2, printer heads (not shown) for the color ink compositions of the respective colors are present side by side at the location of the ink head COLOR in FIG. 2 sequentially from the upper region side to the lower region side of the transportation direction. Specifically, the respective heads of a black ink head, a cyan ink head, a magenta ink head, and a yellow ink head are sequentially provided at the location of the ink head COLOR in FIG. 2 from the upper region side. In addition, the color head COLOR, and a clear head CL are provided sequentially from the upper region side of the transportation direction as shown in FIG. 2.

In the embodiment of FIG. 2, the first preliminary curing irradiation section 42e is provided on the lower region side of the ink head COLOR in the transportation direction. In addition, other than the first preliminary curing irradiation section 42e, the second preliminary curing irradiation section 42f is provided on the lower region side of the clear ink head CL in the transportation direction. Furthermore, the primary curing irradiation section 44 is provided on the lower region side of the second preliminary curing irradiation section 42f in the transportation direction.

2. Apparatus Operation

After receiving printing data from the computer 110, which is an external apparatus, the printer 1 controls the respective units (respective sections), that is, the transportation unit 20, the head unit 30, and the irradiation unit 40 through the controller 60 so as to form images on a recording medium according to the printing data. The controller 60 controls the respective sections based on the printing data received from the computer 110, and forms images on a recording medium. The status in the printer 1 is monitored by the detector group 50, and the detector group 50 outputs the detection results to the controller 60. The controller 60 controls the respective sections based on the detection results received from the detector group 50.

In the transportation unit 20, when a transportation motor (not shown) is rotated, the upper region side transportation roller 23A and the lower region side transportation roller 23B as shown in FIG. 2 are rotated, and the belt 24 is moved. The recording medium S fed by a paper-feeding roller (not shown) is transported up to a recordable region (the region facing the print head) by the belt 24. In addition, the recording medium S that has passed this area is ejected outward by the belt 24.

At this time, the transportation unit 20 (scanning section) discharges an ink (the ultraviolet curable ink set as described below) from the head unit 30 while relatively scanning the recording medium S in the transportation direction (scanning direction) with respect to the head unit 30 (print head). Discharging of the ink may be carried out while scanning, in which the head unit 30 is moved with respect to the recording medium S, is carried out without carrying out the transportation of the recording medium S. Here, when the scanning, in which the recording medium S is moved with respect to the head unit 30, is carried out, the side to which the recording medium S is transported is the lower region, and when the scanning, in which the head unit 30 is moved with respect to the recording medium S, is carried out, the side to which the head unit 30 is moved is the upper region side.

Meanwhile, the recording medium S may be electrostatic absorbed or vacuum absorbed to the belt 24 during transportation. In addition, in the specification, while the term "paper-feeding" is used for convenience, it is possible to use the recording medium as described below as the recording medium S in the embodiment.

The head unit 30 discharges at least a color ink composition and a clear ink composition as an ultraviolet curable ink composition for forming images.

The head unit 30 discharges the respective inks with respect to the recording medium S on transportation so as to form dots on the recording medium S (by landing the ink), whereby a coated film is formed so as to form images. The printer 1 is a line printer, and the respective print heads of the head unit 30 (hereinafter also referred to simply as the "head") can form dots as wide as the recording medium. Here, at least one of the heads in the head unit 30 is a head to discharge the ink composition for ultraviolet curable ink jets of the embodiment, and the diameter of the nozzle therein is preferably 25 μm or less, and more preferably 17 μm to 20 μm. When the nozzle diameter is within the above ranges, tailing or mist is small in the ink of the embodiment, and the discharge stability becomes excellent, which leads to improvement in printing quality.

In the irradiation unit 40, dots formed on the recording medium S (landed ink) receive light irradiation from the irradiation unit 40 so as to be cured.

The first preliminary curing irradiation section 42e shown in FIG. 2 carries out the first light irradiation in order to preliminarily cure dots corresponding to the first coated film formed on the recording medium S before the clear ink composition is landed thereon. Since the first preliminary curing irradiation section simply needs to allow preliminary curing to occur, at least a part of the dot (liquid droplets), for example, the dot surface needs to be cured. The soaking of the ink can be prevented by carrying out the preliminary curing.

In addition, the second preliminary curing irradiation section 42f shown in FIG. 2 can reliably suppress bleeding of the color ink and the clear ink by carrying out the second light irradiation so as to rapidly cure the clear ink. Meanwhile, the clear ink may be irradiated only by the primary curing irradiation section 44 without providing the second preliminary curing irradiation section 42f in FIG. 2.

The primary curing irradiation section 44 shown in FIG. 2 primarily cures the color ink composition and the clear ink composition, which are landed on the recording medium, by light irradiation from a light source for primary curing. In other words, the primary curing irradiation section 44 carries out light irradiation in order to primarily cure dots (the first coated film and the second coated film of the clear ink composition) formed on the recording medium S. In addition, the length of the primary curing irradiation section 44 in the width direction of the recording medium S is equal to or larger than the width of the recording medium S. In addition, the primary curing irradiation section 44 irradiates light to dots formed by the respective heads in the head unit 30.

The primary curing irradiation section 44 has a light emitting diode (LED) or a lamp as the light source for primary curing. The lamp is not particularly limited, and examples thereof include a metal halide lamp, a xenon lamp, a carbon-arc lamp, a chemical lamp, a low-pressure mercury lamp, and a high-pressure mercury lamp.

Each of the first preliminary curing irradiation section 42e and the second preliminary curing irradiation section 42f has an LED as the light source for preliminary curing. The LED can easily vary the irradiation energy by controlling the intensity of the input electric current.

The light irradiation energy for primary curing by the primary curing irradiation section 44 is common for both of the ultraviolet curable color ink composition and the ultraviolet curable clear ink composition when primary curing is carried out one time. On the other hand, it is necessary to carry out primary curing on a case-by-case basis after the respective ink compositions are landed on the recording medium in order to differentiate the light irradiation energy for primary curing between the ultraviolet curable color ink composition and the ultraviolet curable clear ink composition. However, when primary curing is carried out two or more times, it becomes cumbersome, and the process for the recording method becomes complicated, and therefore it is preferable to carry out primary curing one time.

When the printer 1 is further provided with the second preliminary curing irradiation section 42f between the clear ink head CL and the primary curing irradiation section 44 as shown in FIG. 2, it is possible to effectively suppress bleeding (color mixing) between the color ink and the clear ink.

The rotary-type encoder that can be provided in the detector group 50 detects the rotation amounts of the upper region side transportation roller 23A and the lower region side transportation roller 23B. It is possible to detect the transportation amount of the recording medium S based on the detection results of the rotary-type encoder. In addition, a paper detecting sensor that can be provided in the detector group 50 detects the location of the front end of the recording medium S during paper-feeding.

Meanwhile, the operations of the respective sections that compose the controller 60 are as described above.

The computer 110 installs a printer driver. The printer driver is a program for displaying user interfaces on a display apparatus (not shown) and converting image data outputted from an application program to printing data (image forming data). This printer driver is recorded in a computer-scannable recording medium, such as a flexible disc or a CD-ROM. Alternatively, the printer driver can also be downloaded in the computer 110 via the internet. Meanwhile, this program is composed of codes for realizing a variety of functions.

In addition, the computer 110 outputs printing data to the printer 1 in order to form images corresponding to the printing data.

Meanwhile, the kinds of the printer 1 (ink jet recording apparatus) in the embodiment as described above include a serial printer as described below in addition to the above line computer. Both have different printer modes. In short, the line printer carries out printing while the head reciprocates (shuttle migration) in the direction perpendicular to the transportation direction of the recording medium. Among them, in the line printer, images are formed by scanning the head only once (single path) with respect to the recording medium in a predetermined direction. When the recording medium is transported in a predetermined transportation direction, the head is scanned relatively in the reverse direction of the transportation direction. In other words, in the line printer, the recording medium passes below the head only once during recording. This is generally called a single path printer.

3. Modified Example

When two or more of color ink compositions are present in the head unit 30, the disposition of the color ink compositions is not limited to the embodiment in which a plurality of heads are disposed side by side at the location of the color head COLOR as described using FIG. 2. For example, the disposition of the color ink compositions may be an embodiment in which a plurality of color heads are sequentially displaced side by side in the transportation direction as separate heads. In this modified example, the heads of the respective color ink compositions may be disposed side by side in the transportation direction, respectively, and come into contact with each other so as to be mutually adjacent or disposed at intervals.

When the heads of the respective color ink compositions are disposed respectively at intervals, the first preliminary curing irradiation section for preliminary curing may also be provided between the respective heads for each head. In summary, the heads of the respective color ink compositions and the first preliminary curing irradiation section may be provided alternately in the irradiation unit 40 (the first preliminary curing irradiation section is provided on the lower region side of each ink color in the transportation direction of the head).

In the embodiment of FIG. 2 and the modified example, the printer 1 is a line printer, and each of the heads in the head unit 30 can form dots as wide as the recording medium at one stroke.

Meanwhile, the recording method of the invention may be carried out in the serial printer. In this case, for example, as described in JP-A-2003-341021, discharging and preliminary curing of an ink composition may be carried out by the head provided in a cartridge and the light source for preliminary curing, and then primary curing may be carried out by a light source for primary curing which is provided at the lower region of the cartridge in the transportation direction.

Recording Method

An embodiment of the invention relates to a recording head. The ink composition for ultraviolet curable ink jets of the embodiment can be used in the recording method of the embodiment. The recording method can be applied to an ink jet mode. The recording method includes a discharging process in which the ink composition is discharged on a recording medium, and a curing process in which ultraviolet rays are irradiated to the ink composition discharged in the discharging process, and the ink composition is cured. A coated film (cured film) is formed by the ink composition cured on the recording medium in this manner.

Discharging Process

In the discharging process, the ink composition is discharged on the recording medium, and the ink composition is attached to the recording medium. The viscosity of the ink composition during discharging is preferably 15 mPa·s or less, and more preferably 9 mPa·s to 14 mPa·s. If the viscosity of the ink composition is within the above ranges even when the temperature of the ink composition is set to room temperature (about 20° C.) or the ink composition is subjected to a state of no heating, the ink composition may be discharged with the temperature of the ink composition at room temperature or without heating the ink composition. Meanwhile, the ink composition may also be discharged after the viscosity is made to be preferable by heating the ink composition to a predetermined temperature. Favorable discharge stability is realized in this manner.

Since the ink composition of the embodiment has a higher viscosity than an aqueous ink composition used in an ordinary ink for ink jet recording, the viscosity change by the temperature change during discharging is large. Such viscosity change of the ink has a large influence on the change of the liquid droplet size and the change of the liquid droplet discharging rate, and, eventually, may cause the degradation of image quality. Therefore, the temperature of the ink during discharging is preferably maintained as constant as possible.

Curing Process

Next, in the curing process, the ink composition discharged and attached on the recording medium is cured by irradiation of ultraviolet rays (light). This is because the photopolymerization initiator included in the ink composition is decomposed by irradiation of ultraviolet rays, initiators, such as radicals, acids, and bases, are generated, and the polymerization reaction of the polymerizable compound is accelerated by the function of the initiators. Alternatively, this is because the polymerization reaction of the polymerizable compound is begun by the irradiation of ultraviolet rays (light). At this time, when a sensitizing dye is present together with the photopolymerization initiator in the ink composition, the sensitizing dye in the system absorbs active radiant rays so as to be in an excited state, and comes into contact with the photopolymerization initiator, whereby the decomposition of the photopolymerization initiator is accelerated, and a higher-sensitivity curing reaction can be achieved.

A mercury lamp, a gas or solid laser, and the like are mainly used as the source of ultraviolet rays, and a mercury lamp and a metal halide lamp are widely known as a light source used for the curing of the ink composition for ultraviolet curable ink jets. At the same time, there is a strong demand for a mercury lamp from the viewpoint of current environment protection, and substitution into a GaN-based semiconductor ultraviolet emitting device is extremely useful in industrial and environmental senses. Furthermore, an ultraviolet light emitting diode (UV-LED) and an ultraviolet laser diode (UV-LD) have a small size, high efficiency, and low costs, and are expected as the light source for ultraviolet curable ink jet. Among them, an UV-LED is preferred.

Here, it is preferable to use an ink composition that can be cured by irradiating ultraviolet rays having a light emitting peak wavelength preferably in a range of 365 nm to 405 nm, and more preferably in a range of 385 nm to 400 nm using an UV-LED or the like with an irradiation energy of preferably 300 mJ/cm$^2$, and more preferably 100 mJ/cm$^2$ to 200 mJ/cm$^2$. In this case, a decrease in the costs, and an increase in printing rate, that is, shortening of printing duration can be realized. Such an ink composition can be obtained by including at least either of the photopolymerization initiator that is decomposed by ultraviolet ray irradiation in the above wavelength range and the polymerizable compound in which polymerization is initiated by ultraviolet ray irradiation in the above wavelength range.

As described above, according to the three embodiments as described above, it is possible to provide an ink composition for ultraviolet curable ink jets which is excellent in terms of the curing properties and discharge stability of the ink and can prevent the coloration of the cured film in the initial phase after recording, an ink jet recording apparatus using the same, and a recording method.

EXAMPLES

Hereinafter, the embodiments of the invention will be described further specifically using examples and comparative examples, but the embodiments are not limited only to the examples.

Components Used

Components used in the examples and comparative examples below are as follows:

Pigment

FASTOGEN BLUE (color index name: pigment blue 15:4, product name manufactured by DIC Corporation, abbreviated as cyan in the tables)

SYMULER FAST YELLOW (color index name: C.I. pigment yellow 180, product name manufactured by DIC Corporation, abbreviated as yellow in the tables)

MICROLITH-WA Black C-WA (color index name: C.I. pigment black 7, product name manufactured by BASF, abbreviated as black in the tables)

CROMOPHTAL PinkPT (SA) GLVO (color index name: C.I. pigment red 122, product name manufactured by BASF, abbreviated as magenta in the tables)

Pigment White 06 (titanium dioxide, product name manufactured by Mikuni Color, abbreviated as white in the tables)

Dispersant

SOLSPERSE 36000 (amine-based, product name manufactured by the Lubrizol Corporation, abbreviated as amine-based dispersant A in the tables)

Polymerizable Compound

VEEA (2-(2-vinyloxyethoxy)ethyl acrylate, product name manufactured by Nippon Shokubai Co., Ltd., abbreviated as VEEA in the tables)

VISCOAT #192 (phenoxyethyl acrylate, product name manufactured by Osaka Organic Chemical industry Ltd., abbreviated as PEA in the tables)

4-HBA (4-hydroxybutyl acrylate, product name manufactured by Osaka Organic Chemical industry Ltd., abbreviated as 4-HBA in Table 1)

A-DPH (dipentaerythritol hexa acrylate, product name manufactured by Shin-Nakamura Chemical Co., Ltd., abbreviated as A-DPH in the tables)

EBECRYL 7100 (a compound containing two amino groups and two acryloyl groups, product name manufactured by Cytech, Inc., abbreviated as EB7100 in the tables)

KAYARAD R-684 (tricyclodecandimethyloyl diacrylate, product name manufactured by Nippon Kayaku Co., Ltd., abbreviated as R-684 in the tables)

NK ester A-9300 (ethoxylated isocyanuric triacrylate, product name manufactured by Shin-Nakamura Chemical Co., Ltd., abbreviated as A-9300 in the tables)

Polymerization Inhibitor

MEHQ (product name manufactured by Kanto Chemical Co., Inc., abbreviated as MEHQ in the tables)

Leveling Agent

Silicone-based surface adjuster BYK-UV3500 (product name manufactured by BYK Japan K.K., abbreviated as UV3500 in the tables)

Photopolymerization Initiator

IRGACURE 819 (product name manufactured by BASF, abbreviated as 819 in the tables)

DAROCUR TPO (product name manufactured by BASF, abbreviated as TPO in the tables)

KAYACURE DETX-S (product name manufactured by Nippon Kayaku Co., Ltd., abbreviated as DETX-S in the tables)

KAYACURE ITX (product name manufactured by Nippon Kayaku Co., Ltd., abbreviated as ITX in the tables)

IRGACURE 127 (2-hydroxy-1-{4-[4-(2-hydroxy-2-methyl-propionyl)-benzyl]phenyl}-2-methyl-propane-1-one, product name manufactured by BASF, abbreviated as 127 in the tables)

Examples 1 to 19, Reference Examples 1 and 2, Comparative Examples 1 to 8

Firstly, the pigment, dispersant, and VEEA or PEA as described in Tables 1 to 3 below were mixed so as to produce the composition (unit: % by mass) as described in each of the tables, thereby preparing a pigment dispersion liquid. Next, other components as described in each of the tables below were added to the prepared pigment dispersion liquid so as to produce the composition (unit: % by mass) as described in each of the tables, and the mixture was stirred using a high-speed water-cooled stirrer, thereby obtaining an ink composition for ultraviolet curable ink jets of each of the colors (cyan, magenta, yellow, black, white, and clear). Meanwhile, in each of the tables, blank cells signify no addition.

TABLE 1

| Items | Material | 1 | 2 | 3 | 4 | 5 | 6 | 7 | 8 | 9 | 10 | 11 | 12 | 13 |
|---|---|---|---|---|---|---|---|---|---|---|---|---|---|---|
| Pigment dispersion liquids | Cyan | 2.2 | | | | 2.2 | | | | 2.2 | | | | 2.2 |
| | Yellow | | | 3.1 | | | | 3.1 | | | | 3.1 | | |
| | Black | | | | 2.0 | | | | 2.0 | | | | 2.0 | |
| | Magenta | | 4.0 | | | | 4.0 | | | | 4.0 | | | |
| | White | | | | | | | | | | | | | |
| | Amine-based dispersant A | 0.7 | 1.5 | 1.5 | 0.7 | 0.7 | 1.5 | 1.5 | 0.7 | 1.0 | 1.5 | 1.5 | 0.7 | 0.7 |
| | VEEA | | | | | 12.1 | 14.5 | 16.0 | 10.6 | 5.6 | 12.7 | 11.8 | 10.6 | |
| | PEA | 12.1 | 14.5 | 16.0 | 10.6 | | | | | | | | | 12.1 |
| Polymerizable compounds | VEEA | 48.9 | 68.6 | 66.4 | 65.2 | 50.9 | 58.5 | 57.0 | 64.2 | 59.0 | 46.0 | 43.8 | 57.7 | 40.0 |
| | PEA | 21.7 | | | 5.9 | 21.7 | 13.1 | 10.4 | 5.9 | 11.4 | 16.0 | 17.4 | 4.0 | 30.6 |
| | 4-HBA | | | | | | | | | | | | | |
| | R-684 | | | | | | | | | | | | | |
| | A-DPH | | | 1.6 | 4.2 | | | 1.6 | 4.2 | | | 1.6 | 4.2 | |
| | A-9300 | | | | | | | | | | | | | |
| | EB7100 | | | | | | | | | | 8.4 | 8.4 | 8.4 | 8.4 |
| Other additives | MEHQ | 0.2 | 0.2 | 0.2 | 0.2 | 0.2 | 0.2 | 0.2 | 0.2 | 0.2 | 0.2 | 0.2 | 0.2 | 0.2 |
| | UV3500 | 0.2 | 0.2 | 0.2 | 0.2 | 0.2 | 0.2 | 0.2 | 0.2 | 0.2 | 0.2 | 0.2 | 0.2 | 0.2 |
| Photopolymerization initiators | 819 | 6.0 | 6.0 | 6.0 | 6.0 | 4.0 | 4.0 | 4.0 | 4.0 | 6.0 | 6.0 | 6.0 | 6.0 | 6.0 |
| | TPO | 5.0 | 3.0 | 3.0 | 3.0 | 5.0 | 3.0 | 5.0 | 5.0 | 5.0 | 4.0 | 3.0 | 3.0 | 5.0 |
| | DETX-S | 3.0 | 2.0 | 2.0 | 2.0 | 3.0 | 1.0 | 1.0 | 3.0 | 1.0 | 1.0 | 3.0 | 3.0 | 3.0 |
| | ITX | | | | | | | | | | | | | |
| | 127 | | | | | | | | | | | | | |
| Sum | | 100.0 | 100.0 | 100.0 | 100.0 | 100.0 | 100.0 | 100.0 | 100.0 | 100.0 | 100.0 | 100.0 | 100.0 | 100.0 |
| VEEA total | | 48.9 | 68.6 | 66.4 | 65.2 | 63.0 | 73.0 | 73.0 | 74.8 | 64.6 | 58.7 | 55.6 | 68.3 | 40.0 |
| PEA total | | 33.8 | 14.5 | 16.0 | 16.0 | 21.7 | 13.1 | 10.4 | 5.9 | 11.4 | 16.0 | 17.4 | 4.0 | 42.7 |
| Total of APO + thioxanthone | | 14.0 | 11.0 | 11.0 | 11.0 | 12.0 | 8.0 | 10.0 | 12.0 | 12.0 | 11.0 | 12.0 | 12.0 | 14.0 |
| APO total | | 11.0 | 9.0 | 9.0 | 9.0 | 9.0 | 7.0 | 9.0 | 9.0 | 11.0 | 10.0 | 9.0 | 9.0 | 11.0 |

TABLE 2

| | | Examples | | | | | | Reference examples | |
|---|---|---|---|---|---|---|---|---|---|
| Items | Material | 14 | 15 | 16 | 17 | 18 | 19 | 1 | 2 |
| Pigment dispersion liquids | Cyan | 2.2 | 2.2 | 2.2 | | | | | |
| | Yellow | | | | | | 3.1 | | |
| | Black | | | | | 4.0 | | 2.0 | |
| | Magenta | | | | 4.0 | | | | |
| | White | | | | | | | | 20.0 |
| | Amine-based dispersant A | 0.7 | 0.7 | 0.7 | 1.5 | 1.5 | 0.7 | 5.0 | |
| | VEEA | | | | | | | | |
| | PEA | 12.1 | 12.1 | 12.1 | 14.5 | 16.0 | 10.6 | 8.2 | |
| Polymerizable compounds | VEEA | 10.0 | 40.0 | 30.0 | 32.0 | 33.0 | 40.0 | 43.9 | 40.2 |
| | PEA | 40.0 | 30.6 | 23.7 | | | 3.9 | 13.0 | 13.0 |
| | 4-HBA | 10.0 | | 17.9 | 35.6 | 28.4 | 23.3 | | 26.5 |
| | R-684 | | | | | | | | 8.0 |
| | A-DPH | 4.0 | | | | 1.6 | 4.2 | | |
| | A-9300 | | | | | | | 1.5 | |
| | EB7100 | 6.6 | | | | | | | |

TABLE 2-continued

|  |  | Examples |  |  |  |  |  | Reference examples |  |
|---|---|---|---|---|---|---|---|---|---|
| Items | Material | 14 | 15 | 16 | 17 | 18 | 19 | 1 | 2 |
| Other additives | MEHQ | 0.2 | 0.2 | 0.2 | 0.2 | 0.2 | 0.2 | 0.2 | 0.1 |
|  | UV3500 | 0.2 | 0.2 | 0.2 | 0.2 | 0.2 | 0.2 | 0.2 | 0.2 |
| Photopolymerization initiators | 819 | 6.0 | 6.0 | 7.0 | 7.0 | 7.0 | 7.0 | 3.0 | 5.0 |
|  | TPO | 5.0 | 5.0 | 5.0 | 4.0 | 6.0 | 3.0 | 5.0 | 7.0 |
|  | DETX-S | 3.0 |  | 1.0 | 1.0 | 3.0 | 5.0 |  |  |
|  | ITX |  | 3.0 |  |  |  |  |  |  |
|  | 127 |  |  |  |  |  |  |  |  |
| Sum |  | 100.0 | 100.0 | 100.0 | 100.0 | 100.0 |  | 100.0 | 100.0 |
| VEEA total |  | 10.0 | 40.0 | 30.0 | 32.0 | 33.0 | 40.0 | 43.9 | 40.2 |
| PEA total |  | 52.1 | 42.7 | 35.8 | 14.5 | 16.0 | 14.5 | 21.2 | 13.0 |
| Total of APO + thioxanthone |  | 14.0 | 14.0 | 13.0 | 12.0 | 16.0 | 15.0 | 8.0 | 12.0 |
| APO total |  | 11.0 | 11.0 | 12.0 | 11.0 | 13.0 | 10.0 | 8.0 | 12.0 |

TABLE 3

|  |  | Comparative examples |  |  |  |  |  |  |  |
|---|---|---|---|---|---|---|---|---|---|
| Items | Material | 1 | 2 | 3 | 4 | 5 | 6 | 7 | 8 |
| Pigment dispersion liquids | Cyan | 2.2 |  |  |  | 2.2 | 2.2 | 2.2 | 2.2 |
|  | Yellow |  |  | 3.1 |  |  |  |  |  |
|  | Black |  |  |  | 2.0 |  |  |  |  |
|  | Magenta |  | 4.0 |  |  |  |  |  |  |
|  | White |  |  |  |  |  |  |  |  |
|  | Amine-based dispersant A | 0.7 | 1.5 | 1.5 | 0.7 | 0.7 | 0.7 | 0.7 | 0.7 |
| Polymerizable compounds | VEEA | 71.0 | 63.8 | 60.0 | 65.2 | 48.9 | 48.9 | 40.0 | 40.0 |
|  | PEA | 6.6 | 8.8 | 11.4 | 9.9 | 21.7 | 21.7 | 30.6 | 25.6 |
|  | VEEA |  |  |  |  |  |  |  |  |
|  | PEA |  |  |  |  |  |  |  |  |
|  | 4-HBA |  |  |  |  |  |  |  |  |
|  | R-684 |  |  |  |  |  |  |  |  |
|  | A-DPH |  |  |  | 1.6 | 4.2 |  |  |  |
|  | A-9300 |  |  |  |  |  |  |  |  |
|  | EB7100 |  |  |  |  |  |  |  |  |
| Other additives | MEHQ | 0.2 | 0.2 | 0.2 | 0.2 | 0.2 | 0.2 | 0.2 | 0.2 |
|  | UV3500 | 0.2 | 0.2 | 0.2 | 0.2 | 0.2 | 0.2 | 0.2 | 0.2 |
| Photopolymerization initiators | 819 | 3.0 | 3.0 | 3.0 | 3.0 | 7.0 |  | 6.0 | 7.0 |
|  | TPO | 3.0 | 3.0 | 3.0 | 3.0 | 7.0 |  | 5.0 | 7.0 |
|  | DETX-S | 1.0 | 1.0 | 1.0 | 1.0 |  | 14.0 |  | 5.0 |
|  | ITX |  |  |  |  |  |  |  |  |
|  | 127 |  |  |  |  |  |  | 3.0 |  |
| Sum |  | 100.0 | 100.0 | 100.0 | 100.0 | 100.0 | 100.0 | 100.0 | 100.0 |
| VEEA total |  | 83.1 | 78.3 | 75.0 | 75.8 | 48.9 | 48.9 | 40.0 | 40.0 |
| PEA total |  | 6.6 | 8.8 | 11.4 | 9.9 | 33.8 | 33.8 | 42.7 | 37.7 |
| Total of APO + thioxanthone |  | 7.0 | 7.0 | 7.0 | 7.0 | 14.0 | 14.0 | 11.0 | 19.0 |
| APO total |  | 6.0 | 6.0 | 6.0 | 6.0 | 14.0 | 0.0 | 11.0 | 14.0 |

Evaluation Items

1. Curing Properties of the Ink

Printing and curing for the curing properties of the ink were carried out in the following manner. Firstly, a surface-treated PET was attached on the table of a transportation unit configured to straightly transport test samples, and moved. The ink was discharged from the ink jet head in the middle, the transportation unit was passed below an irradiator, and light is hit on printing samples, thereby confirming the curing properties. Printing was carried out with the resolution set to 720 dpi×720 dpi and the weight of the ink during printing set to 10 ng/1 dot. The irradiation intensity of the irradiator was set to 1 W/cm². Printing samples were printed in a size of 1 inch×1 inch. The energy amount was adjusted by changing the transportation speed of the sample.

A solid pattern image was touched by a finger until no stickiness was felt, and the irradiated amount of the ultra-violet rays necessary for curing was obtained by measuring the cumulative light intensity at this time using a cumulative light intensity measuring machine UM-40 (manufactured by Konica Minolta Holdings, Inc.).

The evaluation criteria are as follows. 'B' or higher in the evaluation criteria represents a practically allowable criterion. The evaluation results are shown in Tables 4 to 6 below.
A: The cumulative light intensity is 200 mJ/cm² or less.
B: The cumulative light intensity is more than 200 mJ/cm² to 300 mJ/cm² or less.
C: The cumulative light intensity is more than 300 mJ/cm² to 400 mJ/cm² or less.
D: The cumulative light intensity is more than 400 mJ/cm².

2. Viscosity of the Ink

The viscosity of the ink composition in each of the examples and the comparative examples was measured at 20° C. using a RHEOMETER MCR300, manufactured by DKSH Japan K.K.

A: 10 mPa·s or less
B: more than 10 mPa·s or less to 15 mPa·s or less

3. Discharge Stability

Evaluation was carried out using an ink jet printer provided with a high-speed MACH head that can realize high-speed printing (the nozzle diameter was 20 μm, and the head had 180 nozzles/inch) (PX-FA700 (product name), manufactured by Seiko Epson Corporation). The ink compositions in the respective examples and the respective comparative examples were separately filled in the high-speed MACH head, and the discharge stability was evaluated based on the number of clogged nozzles when the ink was continuously discharged for 5 minutes.

The evaluation criteria are as follows. The evaluation results are shown in Tables 3 and 4 below. Meanwhile, evaluation was "D" for all heads in which mist (a cause of contamination of images) occurred during printing. In addition, the "return" in the "A" evaluation refers to the fact that the head was flushed (the voltage was increased in comparison to the printing voltage) during discharging so that the discharging state was returned.

A: No clogged nozzle
B: Some nozzles were clogged, but returned.
C: The number of clogged nozzles was 1 to 5.
D: The number of clogged nozzles exceeded 5.

For complementary description, 180 nozzles were present in one inch of the head. When nozzles that discharge an ink having a poor discharge stability were present, and printing was continued using the ink, discharging was not sufficiently carried out in some of the 180 nozzles. The number of nozzles with insufficient discharging is used as the index of discharge stability.

In summary, the "A" evaluation was determined when there was no nozzle with insufficient discharging (clogging), the "B" evaluation was determined when there were clogged nozzles in the middle, but the nozzles were returned if printing was continued, the "C" evaluation was determined when 1 to 5 nozzles were clogged among 180 nozzles, and the "D" evaluation was determined when 5 or more nozzles were clogged, respectively. Meanwhile, the case in which 1 to 5 nozzles were clogged among 180 nozzles can be further classified into a case in which the discharging state was restored by flushing (elevation to the "A" evaluation) and a case in which the discharging state was not returned (the "C" evaluation).

4. Surface Tension of the Cured Film

The surface tension of the cured film was measured using CBVP-Z, a surface tensiometer manufactured by Kyowa Interface Science. The measured values are shown in Tables 3 and 4 below.

5. Degree of Coloration of the Cured Film in the Initial Phase

The color of a recorded object was measured using CIE Lab (L*a*b* coding). In addition, the color difference (ΔE) was obtained from the colors of recorded objects (images) obtained from standard examples and the ink composition of each of the examples using the following formula. Specifically, Example 8 was used as the standard example for black ink compositions, and, for the ink compositions of colors other than the black ink, on the assumption that the pigment and the pigment dispersant in Example 8 were substituted into the kind and amount of the pigment and the dispersant in each of the examples, the difference in the amounts of the pigment and the dispersant from those in Example 8 was adjusted by increasing and decreasing the VEEA so that the total became 100% by mass, and the difference was used as the standard example.

The color measurement was carried out on a recorded object that had been printed one hour before.

$$\Delta E = (\Delta a^{*2} + \Delta b^{*2} + \Delta L^{*2})^{(1/2)}$$

The evaluation criteria are as follows. The "A" in the evaluation criteria represents a practically allowable result. The evaluation results are shown in Tables 3 and 4 below.

A: ΔE was less than 2.0.
B: ΔE was 2.0 or more.

TABLE 4

| | Examples | | | | | | | | | | | | |
|---|---|---|---|---|---|---|---|---|---|---|---|---|---|
| Evaluation tests | 1 | 2 | 3 | 4 | 5 | 6 | 7 | 8 | 9 | 10 | 11 | 12 | 13 |
| Curing properties | A | A | A | A | A | B | A | B | A | A | A | B | B |
| Viscosity | B | B | B | B | A | A | A | A | B | B | B | B | B |
| Discharge stability | B | B | B | B | B | B | B | C | B | B | B | C | B |
| Surface tension | 22.5 | 23.0 | 23.0 | 22.6 | 22.0 | 22.1 | 22.5 | 22.3 | 22.5 | 23.0 | 22.6 | 22.7 | 22.5 |
| Degree of coloration in the initial phase | B | B | B | B | B | B | B | B | B | B | B | B | B |

TABLE 5

| | Examples | | | | | | Reference examples | |
|---|---|---|---|---|---|---|---|---|
| Evaluation tests | 14 | 15 | 16 | 17 | 18 | 19 | 1 | 2 |
| Curing properties | C | C | C | C | B | B | A | A |
| Viscosity | B | B | B | B | B | B | B | B |
| Discharge stability | B | B | B | B | C | C | B | B |
| Surface tension | 22.4 | 22.5 | 22.5 | 23.0 | 23.0 | 22.6 | 22.7 | 22.8 |
| Degree of coloration in the initial phase | B | B | B | B | B | B | B | B |

TABLE 6

| | Comparative examples | | | | | | | |
|---|---|---|---|---|---|---|---|---|
| Evaluation tests | 1 | 2 | 3 | 4 | 5 | 6 | 7 | 8 |
| Curing properties | D | D | D | D | B | D | D | A |
| Viscosity | A | A | A | A | B | B | B | B |
| Discharge stability | D | D | B | D | B | B | C | D |

TABLE 6-continued

| Evaluation tests | Comparative examples | | | | | | | |
|---|---|---|---|---|---|---|---|---|
| | 1 | 2 | 3 | 4 | 5 | 6 | 7 | 8 |
| Surface tension | 22.2 | 22.4 | 22.1 | 22.5 | 22.5 | 22.5 | 22.5 | 22.5 |
| Degree of coloration in the initial phase | B | B | B | B | D | B | B | D |

It was found from the above Tables 4 to 6 that all of the examples in which the ink compositions for ultraviolet curable ink jets including the VEEA (monomer A) and the photopolymerization initiator containing 9% by mass to 16% by mass of the acylphosphine-based photopolymerization initiator and the thioxanthone-based photopolymerization initiator in the ink were used were excellent in all of the evaluation items. In addition, examples containing more phenoxyethyl acrylate than Example 8 and Example 12 were superior in the curing properties and the discharge stability.

In contrast to this, in Comparative Example 6 containing no acylphosphine-based photopolymerization initiator, the curing properties were degraded. Meanwhile, in Comparative Example 5 containing no thioxanthone-based photopolymerization initiator, the degree of coloration of the cured film in the initial phase was high, and therefore a problem occurred in the image quality, and, in Comparative Example 7, the curing properties were degraded, and therefore the discharge stability was degraded.

In addition, in Comparative Examples 1 to 4 in which the total amount of the acylphosphine-based photopolymerization initiator and the thioxanthone-based photopolymerization initiator in the ink was below 9% by mass, the curing properties were degraded. The reason is that the total amount of the initiator was small, and the curing properties were degraded.

In addition, in Comparative Example 8 in which the total amount of the acylphosphine-based photopolymerization initiator and the thioxanthone-based photopolymerization initiator in the ink was above 16% by mass, the coloring properties in the initial phase and the discharge stability were degraded.

Furthermore, Reference Example 1, which was a white ink composition, and the Reference Example 2, which was a clear ink composition, did not contain the thioxanthone-based photopolymerization initiator, but the curing properties and the coloring properties in the initial phase were favorable. It was found from the above fact that use of the ink compositions in the examples and the ink compositions in the reference examples as an ink set can produce an ink set having favorable curing properties, and coloring properties in the initial phase.

The entire disclosure of Japanese Patent Application No.: 2010-277260, filed Dec. 13, 2010 and 2011-159615, filed Jul. 21, 2011 are expressly incorporated by reference herein.

What is claimed is:

1. An ink composition for ultraviolet curable ink jets, comprising: monomer A represented by the following formula (I) CH2=CR1-COOR2—O—CH=CH—R3 (I) (in the formula, 'R1' represents a hydrogen atom or methyl group, 'R2' represents a divalent organic residue having a carbon number of 2 to 20, and 'R3' represents a hydrogen atom or a monovalent organic residue having a carbon number of 1 to 11), a photopolymerization initiator containing an acylphosphine oxide-based photopolymerization initiator and a thioxanthone-based photopolymerization initiator, and at least one monofunctional (meth)acrylate having an aromatic skeleton other than the monomer A; wherein: the content of the acylphosphine oxide-based photopolymerization initiator is 13% by mass or less with respect to the total mass of the ink composition and the thioxanthone-based photopolymerization initiator is 5% by mass or less with respect to the total mass of the ink composition.

2. The ink composition for ultraviolet curable ink jets according to claim 1, wherein the thioxanthone-based photopolymerization initiator includes 2,4-diethylthioxanthone.

3. The ink composition for ultraviolet curable ink jets according to claim 1, wherein the content of the acylphosphine oxide-based photopolymerization initiator is 7% by mass to 13% by mass with respect to the total mass of the ink composition, and the content of the thioxanthone-based photopolymerization initiator is 1% by mass to 5% by mass with respect to the total mass of the ink composition.

4. The ink composition for ultraviolet curable ink jets according to claim 1, wherein the content of the monomer A is 10% by mass to 75% by mass with respect to the total mass of the ink composition.

5. The ink composition for ultraviolet curable ink jets according to claim 1, wherein the monomer A is 2-(vinyloxyethoxy)ethyl (meth)acrylate.

6. The ink composition for ultraviolet curable ink jets according to claim 1, containing phenoxyethyl(meth)acrylate.

7. The ink composition for ultraviolet curable ink jets according to claim 1, wherein the viscosity at 20° C. is 15 mPa·s or less.

8. The ink composition for ultraviolet curable ink jets according to claim 1, further including a color material.

9. The ink composition for ultraviolet curable ink jets according to claim 1 that can be cured by irradiating ultraviolet rays having a light emitting peak wavelength in a range of 365 nm to 405 nm at an irradiation energy of 300 mJ/cm$^2$ or less.

10. An ink jet recording method in which the ink composition for ultraviolet curable ink jets according to claim 1 is discharged through a head having nozzles and attached to a recording medium, and the attached ink composition for ultraviolet curable ink jets is photo-irradiated with irradiation from a light source.

11. An ink set composed of at least one of the ink compositions for ultraviolet curable ink jets according to any one of claims 1 to 9, and at least any of a white ink composition for ultraviolet curable ink jets including no thioxanthone-based photopolymerization initiator and a clear ink composition for ultraviolet curable ink jets.

12. The ink composition for ultraviolet curable ink jets according to claim 1, wherein the monofunctional (meth)acrylate having an aromatic skeleton other than the monomer A includes at least one of phenoxyethyl (meth)acrylate, 2-hydroxy-3-phenoxypropyl (meth)acrylate.

13. The ink composition for ultraviolet curable ink jets according to claim 1, wherein the total content of the acylphosphine oxide-based photopolymerization initiator and the thioxanthone-based photopolymerization initiator is 8% by mass to 16% by mass with respect to the total mass of the ink composition.

14. The ink composition for ultraviolet curable ink jets according to claim 1, wherein the content of the monofunctional (meth)acrylate having an aromatic skeleton other than the monomer A is from 10 to 75% by mass with respect to the total mass of the ink composition.

15. The ink composition for ultraviolet curable ink jets according to claim 1, wherein the content of the thioxanthone-based photopolymerization initiator is equal to 3% by mass or less with respect to the total mass of the ink composition.

16. The ink jet recording method according to claim 10, wherein the light source is a UV-LED with an irradiation energy of less than or equal to 400 mJ/cm$^2$.

* * * * *